March 20, 1962 N. EDERER 3,026,038
CHART RECORDING SYSTEM
Filed June 3, 1960 6 Sheets-Sheet 1

INVENTOR.
Norbert Ederer

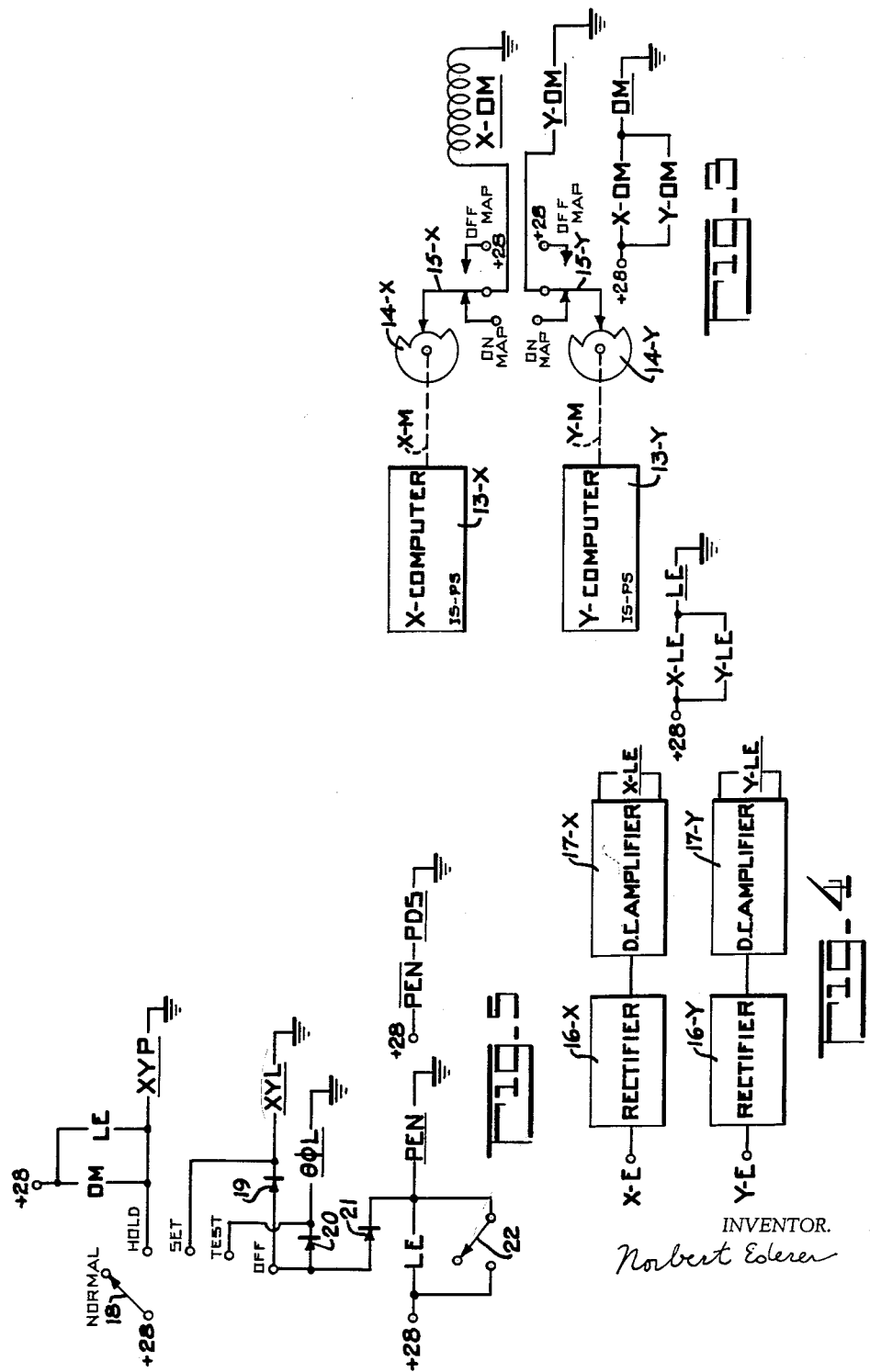

March 20, 1962  N. EDERER  3,026,038
CHART RECORDING SYSTEM
Filed June 3, 1960  6 Sheets-Sheet 3
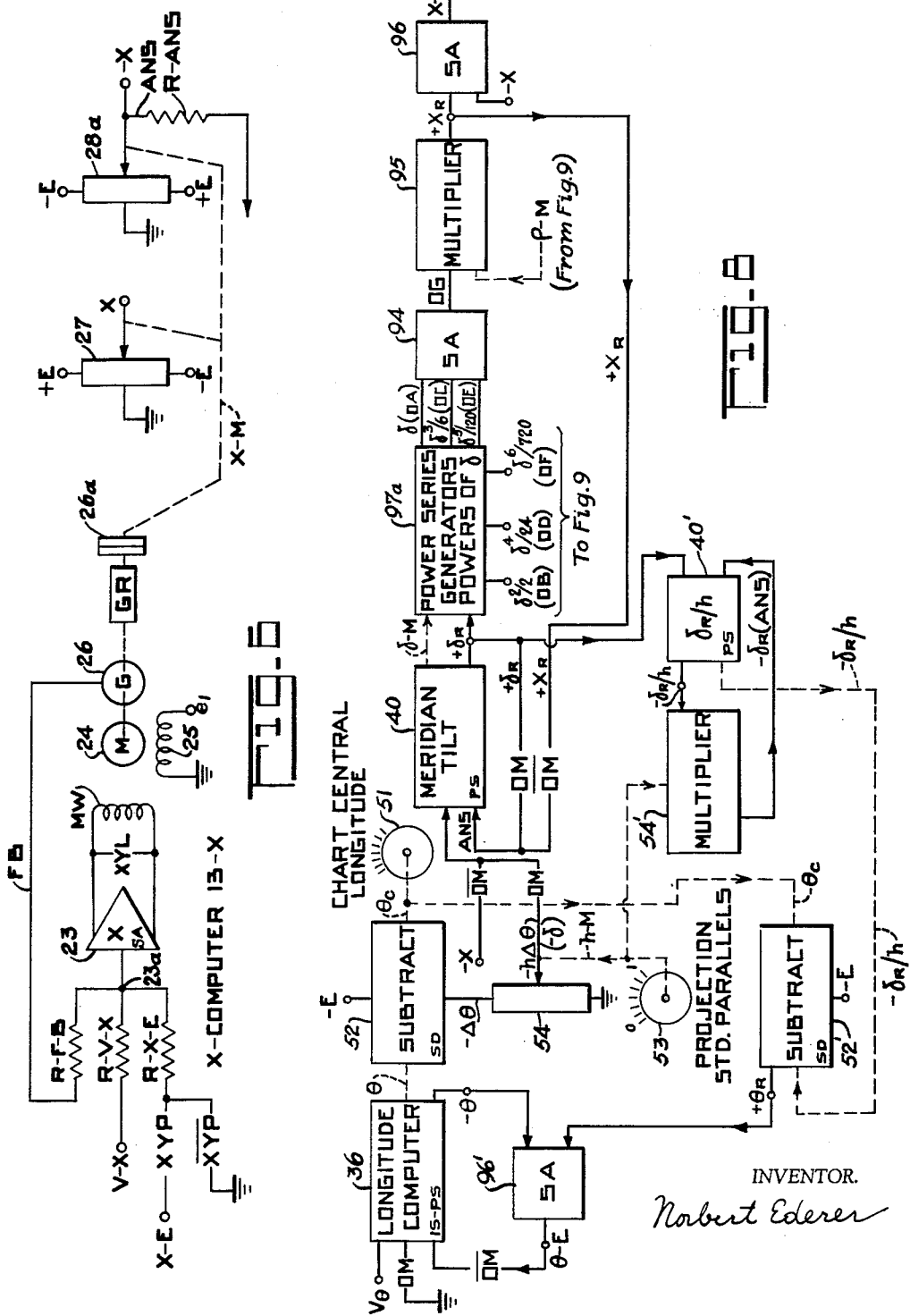
INVENTOR.
Norbert Ederer March 20, 1962 N. EDERER 3,026,038
CHART RECORDING SYSTEM
Filed June 3, 1960 6 Sheets-Sheet 4
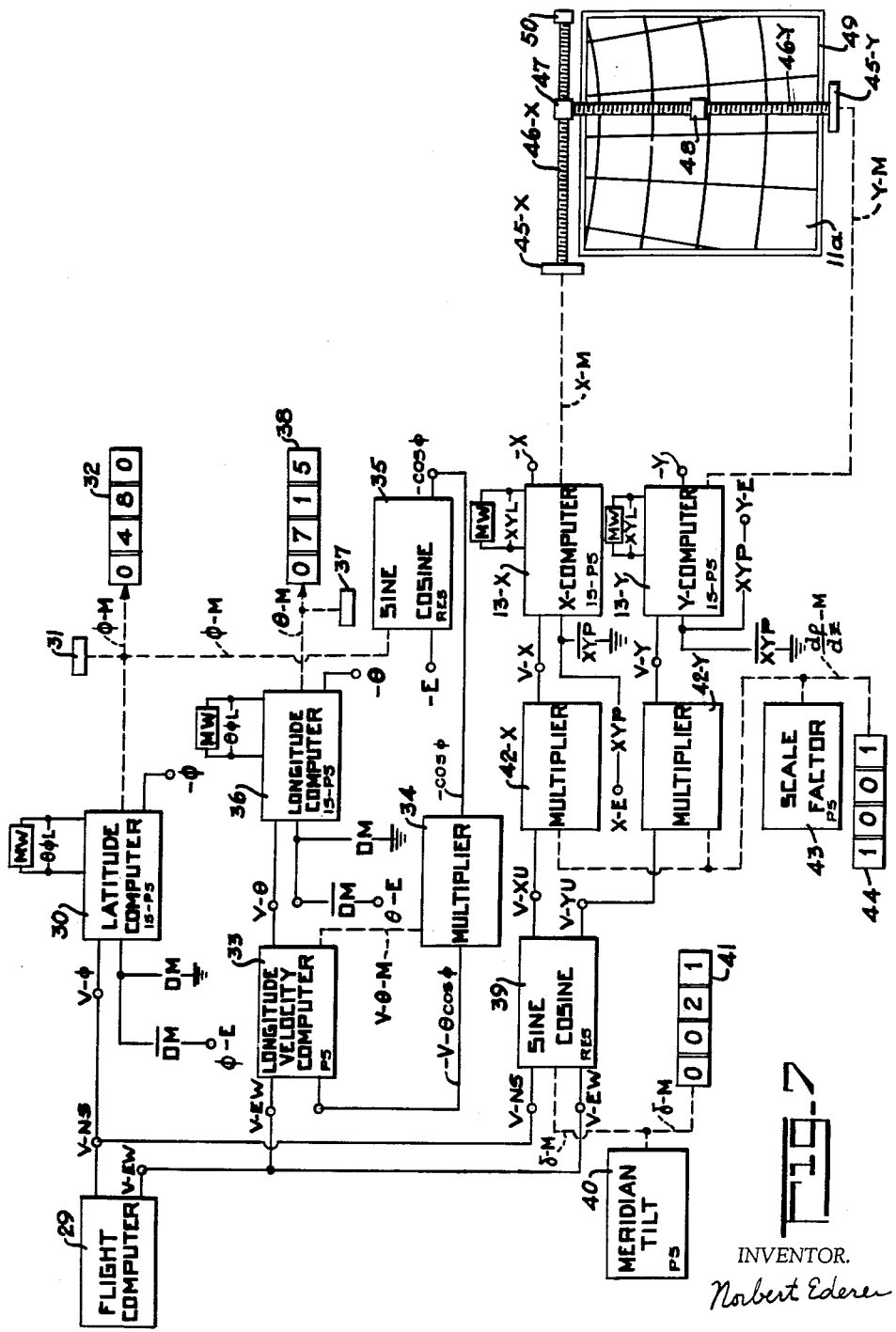
INVENTOR.
Norbert Ederer

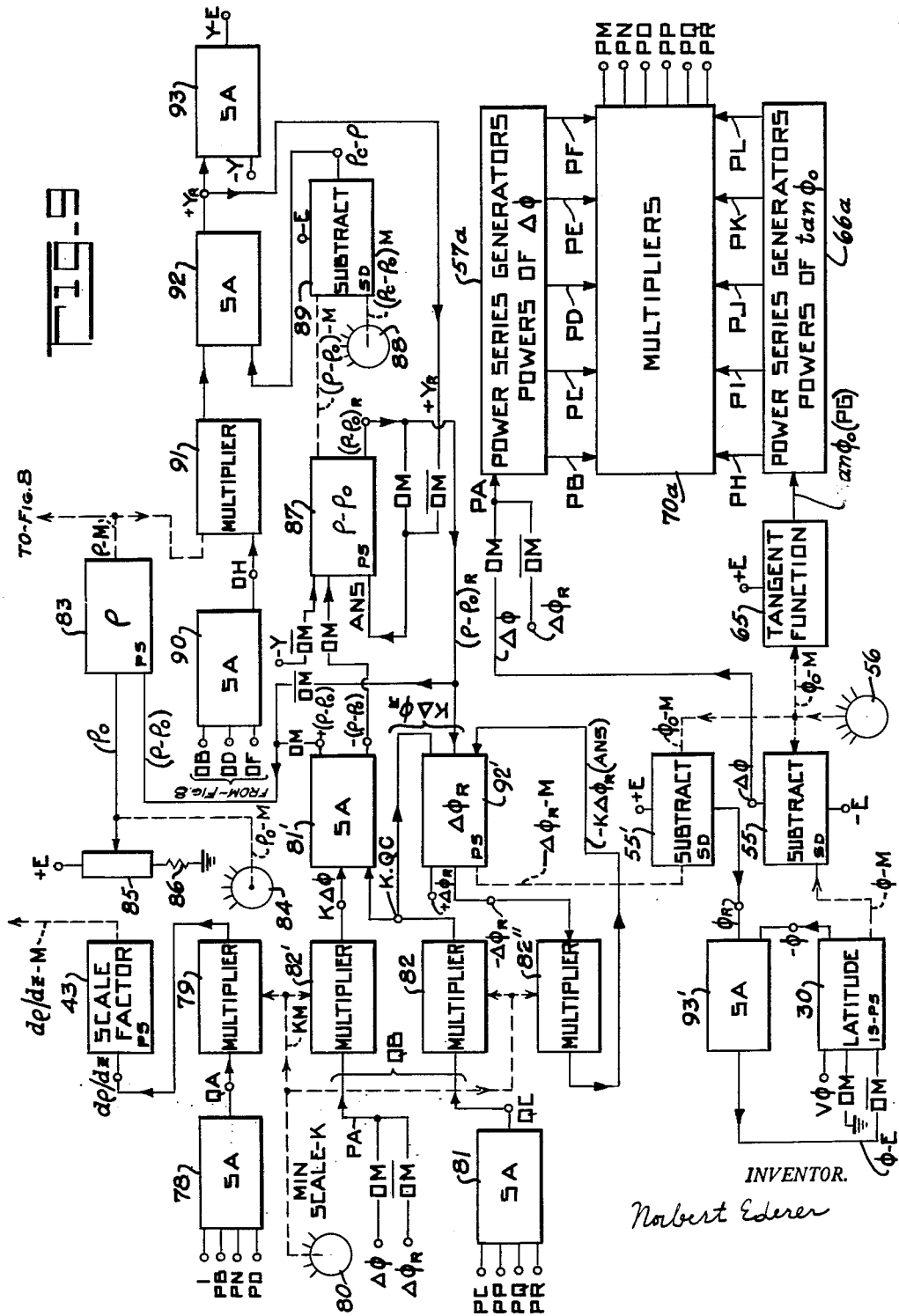

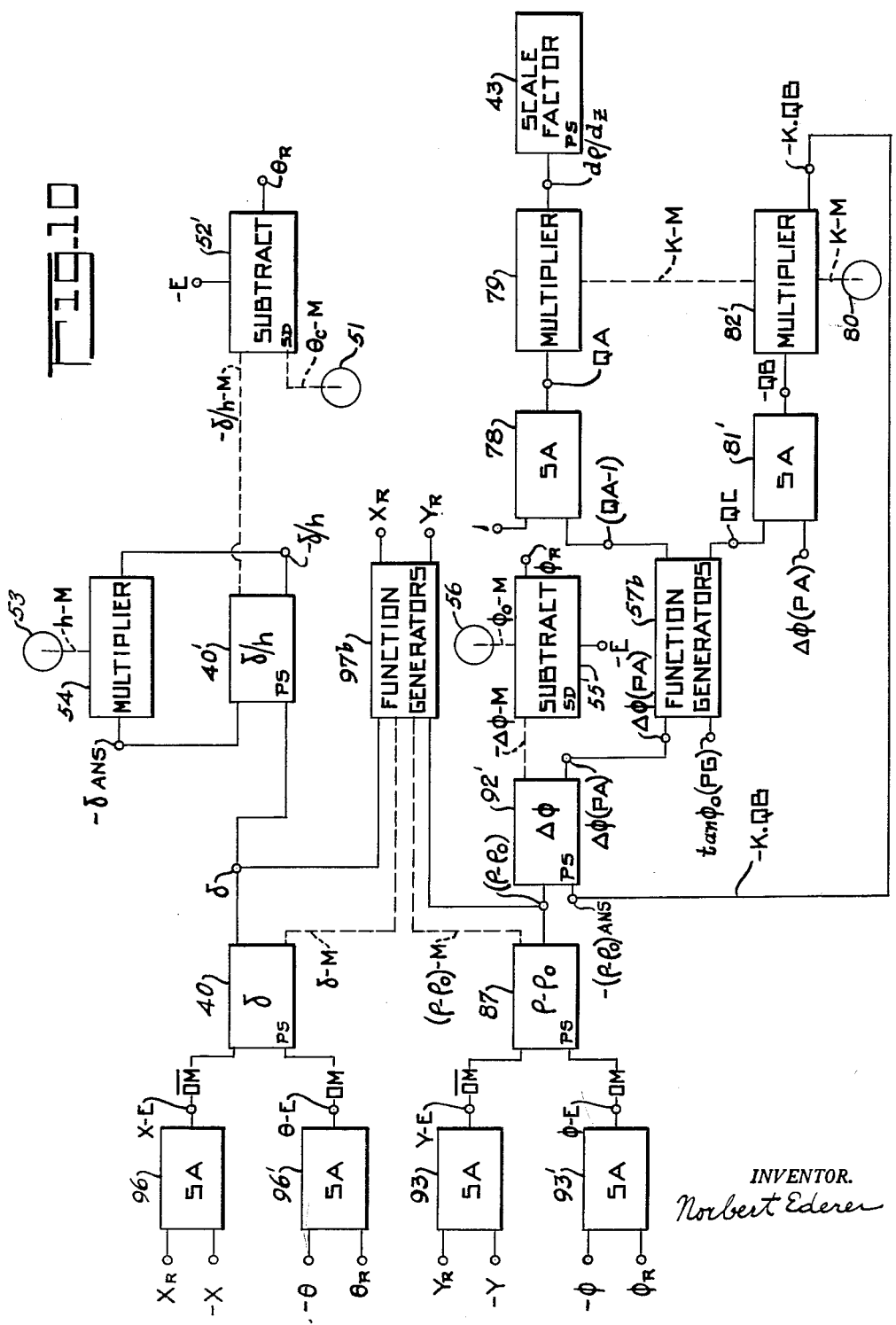

United States Patent Office 3,026,038
Patented Mar. 20, 1962

3,026,038
CHART RECORDING SYSTEM
Norbert Ederer, Fairlawn, N.J., assignor to Curtiss-Wright Corporation, a corporation of Delaware
Filed June 3, 1960, Ser. No. 33,658
20 Claims. (Cl. 235—187)

This invention relates to apparatus for navigational training, and more particularly is concerned with apparatus for recording and indicating the flight location and path of a simulated or actual aircraft.

Apparatus of the general character contemplated by the present invention is known in the art, examples being the U.S. Patents 2,829,446, granted to Cutler et al., on April 8, 1958, and 2,878,585, granted to J. W. Steiner on March 24, 1959. In these patents, a flight computer provides, on a continuous basis, electrical signals which represent the instant ground speed components of the craft along the North-South and East-West directions. Means are provided for integrating the ground speed components, which means generally comprise a pair of integrating motors. The latter impart respective motions in the horizontal and vertical directions to a recording pen which traces out the flight path on a navigation map or chart. As the map may represent a substantial portion of the globe it is necessary to correct for earth curvature, for the true vertical will generally not represent a meridian, nor will the true horizontal represent a parallel. The Cutler et al. and Steiner patents are directed to recording on so-called Lambert projection charts. The usual concept for computing the earth curvature correction in connection with Lambert conformal charts is the angle of meridian tilt. This is the angle formed by the intersection of the true vertical and the meridian at a given point. The mentioned patents disclose apparatus, which computes the angle of meridian tilt as a function of the instant flight position as plotted on the chart. The computed meridian tilt is utilized as a correction factor that is applied to the ground speed components. In this manner the flight path is traced out in agreement with the meridians and parallels of the map with an accuracy which had been heretofore considered as sufficient. An example of earth curvature correction as applied to Mercator projection charts is shown in U.S. Patent 2,853,800, granted to Cutler on September 30, 1958.

In navigational recording and indicating apparatus of the general character contemplated by the present invention, it is also the usual practice to utilize the ground speed signals to operate further integrators for computing and indicating the location of the flight in terms of degrees of latitude and longitude without reference to any map. It is desirable to base the latitude and longitude directly on the ground speed components rather than on the map data. In many instances the craft is outside the limits of any map whatsoever.

Also the computed latitude and longitude form a means for deciding that plotting on a particular map should commence, continue and terminate.

A principal difficulty with the independent computation of latitude on the one hand, and of the flight path as recorded on the chart on the other hand, is the fact that agreement of the two sets of computations cannot be maintained for a prolonged period of time. This is due to accumulation of errors in respective computing channels, also to inaccuracies inherent in the map. The projection is an attempt to represent a portion of a spherical body on a plane surface and this cannot be done absolutely correctly everywhere on the map.

The fact of disagreement of map plot and latitude and longitude indication has heretofore been accepted. This is because the flight paths had been generally limited to the confines of a single map. The present invention contemplates flight courses that traverse major portions of the globe and therefore a succession of maps, with or without intervals during which the flight is not within the confines of any map. In the latter case reliance must be had exclusively on the latitude and longitude indicators. Disagreement in the two forms of data presentation becomes a serious problem under such circumstances, as it is not known which of the data is most reliable and can therefore be used as basis for commencing the plotting on a new map.

The copending application of Charles F. Zahner and Ralph L. Samson, Ser. No. 6,989, filed February 5, 1960, and assigned to the assignee of the present invention, discloses a scheme for overcoming the difficulties of the prior art. The approach of the Zahner et al. application may be summarized briefly, referring preliminarily to FIG. 7 of the present application. A flight computer 29 provides signals V–NS and V–EW which represent North-South and East-West velocity components of the actual or simulated craft. The V–NS signal is integrated by a latitude computer 30, which registers the instant latitude of the craft by means of a number wheel 32. The signal V–EW is ultimately integrated by a longitude computer 36 which registers the instant longitude of the craft by means of a number wheel 38. Components of both signals are ultimately integrated by an X computer 13–X and a Y computer 13–Y, which drive respective lead screws 46–X and 46–Y to plot the course of the craft on a map 11a by means of a pen contained within block 43. X and Y represent Cartesian directions on the map 11a; these are not true East-West and North-South directions, as the map is formed from a conic projection resulting in the indicated coordinate system of map 11a. Therefore both the X and also the Y directions include components of both the East-West and North-South directions, that is components of the longitudinal and latitudinal directions. Therefore the V–NS and V–EW signals are first subjected to earth curvature correction by means of a meridian tilt computer 40 and a scale factor computer 43.

Means (described in greater detail subsequently) are provided which sense whether the craft is within or outside of the confines of the area defined by map 11a. Under "off map" conditions the X and Y computers receive "error" signals X–E and Y–E respectively. These error signals are measures of the difference between the X value as actually computed by the X computer and as recomputed on the basis of the latitude and longitude computers 30 and 36, and of the Y value as computed by the Y computer and as recomputed on the basis of the latitude and longitude computers 30 and 36, respectively. When the error is zero, the map plot is in agreement with the readings of the indicators 32 and 38. Should the map plot fall out of step with the latitude and longitude indications, the error signals resume non-zero values and act to force their respective computers into agreement, thereby diminishing the errors to zero. Thus the X and Y computers are essentially slaved to the latitude and longitude computers. Under "on map" conditions the roles of the computers are reversed; the X and Y computers act as masters for the latitude and longitude computers. This is accomplished by applying the X and Y error signals as error signals to the longitude and latitude computers respectively. The earth curvature correction factors, namely meridian tilt as computed by unit 40, scale factor as computed by unit 43, and a further factor ρ are computed as most direct dependent variables of the latitude and longitude as determined by computers 30 and 36. Strictly speaking, the factor ρ is not an earth curvature correction factor, but is an intermediate variable used in the computation of the earth curvature correction factors. For purposes of the present invention, the factor $\rho$ will be considered an earth curvature correction factor.

The recomputed X and Y signals, which are used to form the error signals, are obtained as dependents of computed latitude and longitude under both "on map" and "off map" conditions, as stated. More particularly, the error signals are computed as most direct dependents of the earth curvature correction factors, which in turn are computed as dependent variables of the latitude and longitude.

The present invention is directed to improvements of apparatus of the kind described in the Zahner et al. application. Its principal object is better precision of computation, and also provision of means to assure that the time lag of falling in step of the slave computers with the master computers shall be minimized.

The approach of the present invention may be briefly summarized as follows. The earth curvature correction factors are computed as most direct dependent variables of the master variables, that is as dependent variables of the actually computed X and Y values under "on map" conditions, and of the latitude and longitude values under "off map" conditions. In this manner the earth curvature correction factors are more accurately and more rapidly computed as dependents of whichever set of variables happens to be the master set and therefore the more accurate set. The earth curvature correction factors are used to compute the recomputed variables, which include, by way of contrast, also latitude and longitude recomputed values. Accordingly, latitude and longitude error signals are also computed, and these rather than the X and Y error signals are applied to the latitude and longitude computers under "on map" conditions to slave them to the X and Y computers.

The computation of the earth curvature correction factors as most direct dependents of the X and Y values is desirable under "on map" conditions, since the X and Y values as then actually computed by their respective computers are more precise than the actually computed latitude and longitude values, the latter being subject to possible error which is ultimately corrected when the respective computers fall in step. Such falling in step is accelerated by use of latitude and longitude error signals since the X and Y error signals both include components of both latitude and longitude errors, requiring repeated interaction among the systems until the errors are reduced to zero.

Under "off map" conditions on the other hand, it is more desirable to compute the earth curvature correction factors most directly as dependents of the most accurate data, namely the actually computed latitude and longitude. Although the correction factors lose meaning as such when the craft is outside of the confines of a map, their computation is necessary to prepare the apparatus for eventual transfer to "on map" conditions, and insure smooth transition with a minimum of time lag. For the same reason it is necessary to compute the X and Y error signals, and maintain the X and Y computers in step, although the X and Y values lose meaning as such with the craft outside of the bounds of a map.

A particularly advantageous feature of the invention resides in the capability of the apparatus to perform the recomputation of the X, Y, latitude and longitude error signals without substantial duplication of apparatus. This will be apparent from the subsequent description. As a result, the apparatus of the Zahner et al. application requires but a minimum of modification to achieve the improved results of the present invention.

Other objects, advantages and novel features of the invention will be better understood from a consideration of the following more detailed specification, of which the appended claims form a part, when considered together with the accompanying drawings, in which:

FIGS. 3, 4 and 5 are partly logical and partly schematic drawings of relay energization circuitry utilized in the apparatus of the invention;

FIG. 6 is a schematic drawing of typical servo circuitry utilized in the apparatus of the invention;

FIG. 7 is a logical drawing of apparatus for computing and indicating latitude, longitude and the X and Y positions of the craft on the map;

FIGS. 8 and 9 are logical drawings of apparatus for computing earth curvature correction factors and error signals according to one embodiment of the invention; and FIG. 10 is a logical drawing of apparatus alternative to that of FIGS. 8 and 9, constituting another embodiment of the invention.

Figure 1:
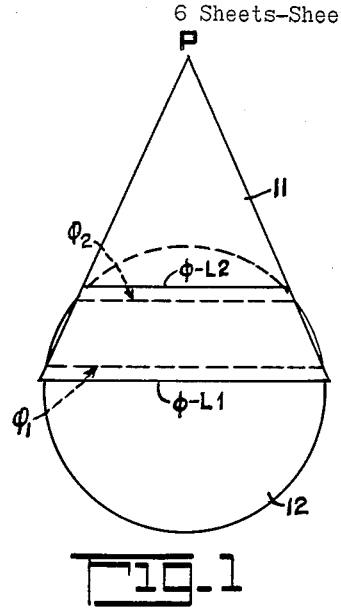
FIGS. 1 and 2 illustrate the mathematical and geographical relations governing the Lambert conformal projection.

Drawing FIGS. 1 to 5 are the same as the like-numbered drawing figures of the Zahner et al. application; FIG. 7 of the two applications are also the same, except for the utilization of latitude and longitude error signals herein; FIGS. 8 and 9 of the present application include elements of FIGS. 8 to 10 of the Zahner et al. application and additional elements peculiar to the present invention. The same is true of FIG. 10 of this application. Elements which correspond to those of the Zahner et al. application are designed by the same reference numerals used in the Zahner et al. application, and are therefore unprimed. Elements peculiar to the present invention are designated by primed reference numerals; the reference numeral apart from the prime sign is made the same as that of an element performing an analogous function, insofar as practicable.

*The Lambert Projection (FIGS. 1 and 2)*

For an appreciation of the invention, it is best to begin with the creation of Lambert projection maps. Referring to FIG. 1, the projection is made by the intersection of a cone 11 with a sphere 12 which represents the earth. The pole point P of the projection is placed above the North Pole, for purposes of preparing Northern Hemisphere charts, and would be placed below the South Pole for Southern Hemisphere charts. The cone 11 intersects the surface of the sphere 12 at two parallels $\phi-1$ and $\phi-2$, which are known as the standard parallels. The useful limits of the projection are parallels designated as $\phi-L1$ and $\phi-L2$. Beyond these limiting parallels the projection is too distorted to be of much use, and other projections, including possibly Lambert projections with pole points located elsewhere, may be employed. In the region near the poles, the so-called stereographic projection is most accurate, whereas in the regions near the Equator and the Mercator projection is most accurate.

Figure 2:
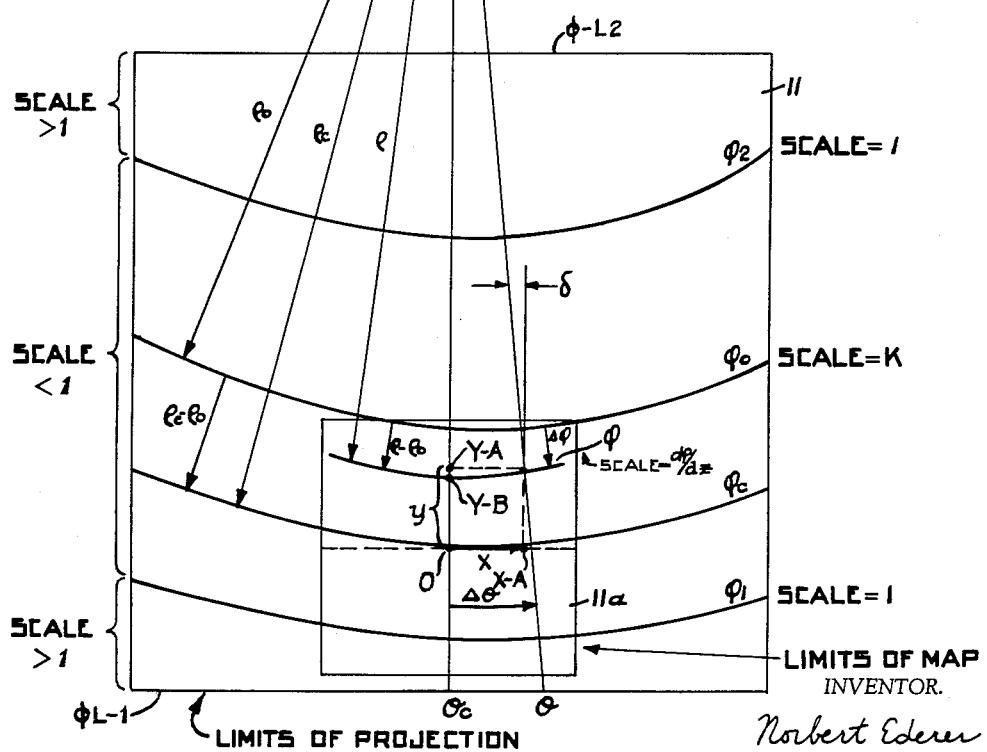

The maps are prepared by developing the surface of the cone, as illustrated in FIG. 2. Here only a portion of the developed surface is shown in the form of the square 11; however the pole point P is included.

The standard parallels $\phi_1$ and $\phi_2$ are developed in the form of concentric circular arcs with the common center at the point P. In addition thereto several other parallels are indicated, also in the form of circular arcs with center at the pole point. These are parallels $\phi_0$, $\phi_c$ and $\phi$, whose significance will be explained immediately hereinafter. The radii of these circular arcs are indicated respectively as $\rho_0$ $\rho_c$ and $\rho$. These radii define meridians. The limiting parallels $\phi-L1$ and $\phi-L2$ are indicated as straight lines for simplicity; actually they should also be concentric arcs with center at the pole point.

The map scale is exactly unity at the standard parallels $\phi_1$ and $\phi_2$, as these parallels are common to the cone and sphere. Intermediate of the standard parallels the scale is less than unity and reaches a minimum scale K at the parallel $\phi_0$. Above and below the standard parallels the scale is greater than unity. From the developed projection 11 maps are prepared, of which the map 11a is exemplary. The map is of square form and is characterized by a meridian $\theta_c$, which passes through the geometric center of the map 11a. Other maps may be centered about other meridians; for example another map might be prepared that is centered about the meridian defined by the radius vector $\rho_0$. The parallel passing through the center of the map 11a is the aforementioned parallel $\phi_c$. The intersection of $\theta_c$ and $\phi_c$ defines the origin O of a Cartesian co-ordinate system for the map 11a from which distances are reckoned in terms of the usual variables X and Y. The instant position of the aircraft may be taken as at the co-ordinates X–A and Y–A. The parallel $\phi$ and the meridian $\theta$ also define the aircraft location.

The following further variables will be of significance in subsequent consideration:

$\Delta\theta$: This is the angular deviation, in the direction of the parallels, of the location of the aircraft from the central meridian, equal to $\theta - \theta_c$.

$\Delta\phi$: This is the angular deviation, reckoned along the meridian, of the aircraft location from the parallel of minimum scale, equal to $\phi - \phi_0$.

$\delta$: This is the angle of meridian tilt formed by the intersection of the meridian $\theta$ and a vertical line drawn through the point of location of the aircraft.

$\rho$: This is the distance from the pole point P to the aircraft location.

$\rho_c - \rho_0$ and $\rho - \rho_0$: These are convenient mathematical concepts, useful in the computation performed by the apparatus of the invention, and are numerical differences expressed by the corresponding symbols. The radius vector $\rho$ is the radial distance from the pole point P to the aircraft location.

$d\rho/dz$: This is the scale applicable to any given point on the map. It is the rate of change of radial distance $\rho$ with respect to the parallels. The variable $z$ is simply the complement of the variable $\phi$

System Relays (FIGS. 3, 4 and 5)

Referring to FIG. 3, there is shown an X computer 13–X, which drives through mechanical shaft connections X–M a cam 14–X that engages a movable contact 15–X. The latter in the indication position of the cam engages a stationary "on map" contact. When the contact 15–X engages the elevation of the cam 14–X, the contact is positioned to engage an alternate stationary "off map" contact. This results in energization of an X "off map" (X–OM) relay, whose energization is traced from the +28 direct voltage source via the off map contact, the contact 15–X, through the relay coil to ground. The function of the X computer will be described hereinafter; for the time being it will suffice to state that it computes the instant X position of the aircraft with reference to the origin of he map 11a of FIG. 2. The X–OM relay is de-energized and energized corresponding to an on map and off map condition of the aircraft in the X direction, respectively. Stated differently, the X–OM relay is deenergized whenever the flight is within the confines of the map or is within the confines of the horizontal map extensions, and is otherwise energized.

The X–OM relay coil is illustrated both in conventional form and also with the symbol X–OM underlined. The remaining relays described hereinafter are simply designated by the symbol identifying the relay underlined. The "normally closed" (NC) contacts of a given relay are identified by the letter symbol of the associated relay with a bar thereabove. The "normally open" (NO) contacts of a relay are identified simply by the letter symbol of the associated relay with no bar above or below. Thus the NC contacts of the X–OM relay would be designated as X̄–ŌM, whereas its NO contacts are simply designated as X–OM. This convention enables determination of the relay states practically by inspection. The convention is similar to those employed in the U.S. Patents 2,750,986 and 2,771,600. "Normalcy" as considered herein refers to the state of the relay with all sources of energization removed.

A Y off map (Y–OM) relay is energized under entirey analogous circumstances. Its excitation circuitry is similar to that of the X–OM relay, as may be seen by the simple substitution of the symbol Y for the symbol X in the corresponding parts. An off map (OM) relay is energized upon energization of at least one of the X–OM and Y–OM relays. Its relay coil is connected on the one side to ground and on the other side through an "or" circuit including NO contacts of the X–OM and Y–OM relays in parallel to the +28 volt source. The OM relay is thus energized whenever the aircraft is outside of the confines of the map.

Referring to FIG. 4, there are shown energization circuits for an "X large error" (X–LE), "Y large error" (Y–LE) and a "large error" (LE) relay. "Large error" signifies that there is a large error between the actual position of the aircraft and the instant position of the plotting pen that records the flight path on the map. Such a condition will exist under the corresponding "off map" conditions, but may also occur under "on map" conditions, for example when plotting maps are exchanged, and the adjustments corresponding to the newly inserted map have not as yet been completed.

The LE relay is energized through an "or" circuit including NO contacts of the X–LE and Y–LE relays in a manner analogous to that of the OM relay. The X–LE and Y–LE relays are energized through analogous channels, as may be recognized by the substitution of the symbol Y for the symbol X in the respective channels. An X error (X–E) alternating analog signal is applied to a rectifier 16–X which biases a direct current amplifier 17–X. The X–LE relay is connected in the output circuit of the amplifier. The arrangement is such that the relay is energized provided the X–E signal attains a minimum amplitude, irrespective of sense. The derivation of the X–E and Y–E signals will be described hereinafter.

Referring to FIG. 5, an instructor operated selector switch 18 is connected to the +28 volt source. It is operable to select five modes of operation by way of energizing and deenergizing the indicated relays XYP, XYL, $\theta\phi$L, PEN, and PDS. The five modes of operation are "normal," "hold," "set," "test," and "off." They are selected by engagement of contact 18 with the respectively like-named stationary contacts. In the "normal" condition the X and Y computers 13–X and 13–Y act as masters for certain latitude and longitude computers 30 and 36 encountered hereinafter, while the flight path is within the confines of the map, as briefly described in the introductory part of the specification. Also in "normal" operation, in the off map or large error conditions, the latitude and longitude computers act as masters for the X and Y computers. In the "hold" condition the latitude and longitude computers act as masters for the X and Y computers, irrespective of the on map or off map conditions. The set condition is generally selected for setting up stations on a map and for changing maps. In the test condition the X and Y computers continue their normal function but the latitude and longitude computers are locked. The test condition is rarely selected; one instance where it might be selected is where the flight path is within the confines of a detailed map covering a relatively small area. This for example might be in the immediate proximity of the airport where latitude and longitude remain substantially constant, so that no earth curvature correction is required. In the off condition all four computers are locked and map plotting ceases. This condition may be selected to "freeze" the problem, so that the instructor may confer with the student and point out to him the errors that the latter has made. Thereafter the problem may be resumed at the point of interruption. The operational modes will be better understood from the further description.

The "XY position" (XYP) relay energization circuit is an "or" circuit including parallel connected NO contacts of the OM and LE relays and switch 18 in the hold position. The "XY locator" (XYL) relay is energized with switch 18 in the set or off positions. The energization path from the "off" contact includes a blocking diode 19 which functions to prevent spurious $\theta\phi L$ relay energization when switch 18 is in the set position. The "$\theta\phi$ locator" ($\theta\phi L$) relay is energized with switch 18 in either the "test" or "off" positions. The latter energization circuit includes a similar blocking diode 20, which functions to prevent spurious energization of the relay when the PEN relay is energized while switch 18 is in "normal," "hold" or "set." The PEN (pen lift) relay is energized with switch 18 in the off position through a further blocking diode 21 which is provided to prevent spurious energization of the XYL and $\theta\phi L$ relays. Alternatively the PEN relay may be energized under large error conditions through the indicated NO contact of the LE relay or upon manual closure of a pen lift switch 22 by the instructor. The pen in question is of course the recording pen; actually the pen is operated to drop rather than lift when activated in the sense that with power disconnected the pen will not engage the recording map surface. To this end a pen drop solenoid (PDS) is energized through the indicated NC contact of the PEN relay.

*Typical Computing Circuit (FIG. 6)*

The detailed circuitry of the X computer 13–X is illustrated in FIG. 6. It is typical of other computing systems illustrated in simple rectangular or triangular block form. The X computer operates as an integrating servo under on map conditions and as a position servo under off map or large error conditions. In the latter case it is slaved to the latitude and longitude computers. The computer includes a summing amplifier 23 to whose input summing junction 23a are applied an external X velocity (V–X) integrand signal through a summing resistor R–V–X, an internal velocity feed-back signal FB through a summing resistor R–FB, and the X error signal X–E through the indicated NO contact of the XYP relay and a summing resistor R–X–E. The latter signal is applied only when the computer operates as a position servo, in which case the X–E signal slaves the servo to the latitude and longitude computers. As will be seen hereinafter the X–E signal is composed of the position signal normally applied to a position servo and of the answer signal normally applied to a position servo, and in fact is the difference of these. With the XYP relay deenergized, the resistor R–X–E is grounded through the indicated NC contact of the relay, and the servo operates as an integrating servo.

In the interest of simplicity a signal, the source that supplies such signal, an output terminal from which the signal is available, an input signal to which such signal is applied and any line carrying such signal are all identified by a common symbol, usually alphabetic. For example the signal V–X is assumed to be derived from V–X source and is applied to the indicated input terminal V–X. Reference to line FB implies that the line carries the signal FB. Conversely reference to the FB signal implies that the signal is carried by the FB line. This concept also extends to the structural member constituting the signal source. For example potentiometer 27 illustrated in FIG. 6 has a slider which provides an output signal X and consequently the output terminal, the line connected thereto and the potentiometer slider connected to such line are all deemed to be identified by the symbol X.

Other computing systems encountered hereinafter may receive more or less than the three signal inputs of the X computer. Some computing systems are simply summing amplifiers and not position or integrating servos, and are therefore designated by SA within the block. A computing system functioning as an integrating servo is designated by the letters IS contained within the block. A computing system functioning as a position servo is designated by the letters PS contained within the block. Since the X (and also Y) computers function alternatively as integrating and as position servos, they have been designated by the symbol IS–PS within the block, as illustrated in FIG. 3. The signals utilized herein are alternating analog voltages that are either in phase with a reference alternating voltage $+E$ encountered hereinafter and therefore in phase opposition to an alternating reference voltage $-E$ of like magnitude, or are respectively in phase opposition to and in phase with such voltages $+E$ and $-E$.

The output of the summing amplifier 23 is applied to the control winding MW of a two-phase induction motor 24 whose other winding 25 is energized by a reference voltage $e_1$ that is 90° out of phase with the reference voltage $+E$. The operation of both position and integrating servos is explained in detail in United States Patent No. 2,731,737, granted to Robert G. Stern on January 24, 1956. Summarized briefly here, the motor 24 will rotate in one direction or the other depending upon the net phase of the external input signals applied to the summing amplifier 23, and at a velocity proportional to the magnitude of such net external input signal. The motor drives through mechanical connections a velocity feed-back generator 26 that generates the signal FB. It also drives a gear reducer GR that drives a slip clutch member 26a, that in turn drives through mechanical connections X–M the sliders X and –X of potentiometers 27 and 28a respectively. The slip clutch member 26a is provided for the X and Y computers, as their respective shafts X–M and Y–M are limite din travel as explained hereinafter. For some of the other computing systems the slip clutch member may be omitted as not required.

The connections X–M are deemed to be a mechanical X shaft position signal X–M as distinguished from the electrical voltage signal X which represents the same analog variable. Typically of other servos, the X computer thus provides bi-polar electrical output signal X and a shaft position signal X. Hereinafter a reference to a shaft position signal will be simply in the form of the shaft position variable X with the symbol M omitted. Reference to an electrical signal will be simply the signal X. The sign of the electrical signal will not be considered except where important. Computing systems which consist simply of summing amplifiers may provide bi-polar or uni-polar signals as required. Where a servo computing system is shown in block form with one or more of the electrical and shaft position signals omitted, it may be assumed that the omitted signal is not externally required. An omitted electrical signal may not even be generated, in which case the requisite structure may be deemed to be omitted, unless such signal is internally required, as for example the negative output signal to serve as answer signal for position servos. In the case of the X computer functioning as a position servo, the answer signal is passed through a rather complicated answer loop and ultimately appears as a component of the XE signal as previously mentioned and as explained more fully hereinafter. For other position servos the internal answer signal is derived from the answer potentiometer slider (–X) and is coupled as the signal ANS through a summing resistor R–ANS to the input junction 23a. The shaft position signal X actuates further mechanically driven members encountered hereinafter.

The potentiometers 27 and 28a are of the "linear" type. Their respective sliders X and –X provide the like-named output signals. The potentiometers are provided with grounded center taps, which correspond to an $X=0$ condition. Potentiometer 27 is energized by reference voltages $+E$ and $-E$ at its upper and lower ends respectively. The converse is true for the potentiometer 28a. The bi-polar energization with grounded center tap is necessary because X deviation occurs in both directions from the origin defined by the grounded center tap. Other servo systems may require only uni-directional deviation from zero, in which case only one reference voltage would be applied to the potentiometer and the ground shifted to its other end. The variable represented by still other servos may not ever go down to zero. In such case the lower end of a potentiometer is returned through a further resistor to ground. These arrangements are well known in the art and are described in greater detail in the aforementioned Stern patent.

The motor winding MW is shortcircuited upon energization of the XYL relay, in which case the motor and all members driven thereby are locked or frozen in place. Motor windings of other servos subject to shortcircuiting by shunting relay contacts are illustrated by the symbol MW enclosed in a rectangle with the short-circuiting relay contact in shunt. This is shown for example for the X computer 13–X in FIG. 7.

In addition to summing and integration, blocks of the subsequently described apparatus performed certain other mathematical function generation. Multiplication is performed by electrically energizing a potentiometer with the multiplier variable signal and its slider with a shaft position multiplicand signal. Thus a multiplier will receive electrical and shaft input signals and will deliver an electrical product output signal. Subtraction in some instances is performed by summing the minuend with the negative of the subtrahend electrical signals. In other instances, where greater precision is desired, the minuend and subtrahend signals are applied in the form of shaft position signals to a well known synchro-differential designated by SD with the subtracter block. The synchro-differential is also energized by a reference voltage that supplies an electrical difference output voltage. Division will be described with reference to the longitude velocity computer 33 of FIG. 7. Nonlinear functions, for example the tangent function, are generated by multipliers except that the selected potentiometer is not linear but has a suitable non-linear contour. The potentiometer may also be shunted in whole or in part by further resistors, or additional resistors may connect tap points of the potentiometer to ground. This method of generating non-linear functions is well known in the art. Sinusoidal functions are generated in some instances by so-called sine-cosine potentiometers. More commonly herein they are generated by well known inductive resolvers, designated by RES within the block. Both forms of sinusoidal function generation are illustrated in the above mentioned Cutler et al. patent.

For a more detailed description of apparatus for computing linear and non-linear functions, reference is made to the above Stern patent and also to Patent No. 2,771,243 for "Apparatus for Simulating an Engine," granted to Wolin et al. on November 20, 1956.

*Typical Operation (FIG. 7)*

The apparatus of FIG. 7 will now be described with reference to a typical training exercise. This may begin with the take-off of the simulated aircraft. Under such circumstances the apparatus is in a quiescent state and the instructor will set in the latitude $\phi$ and the longitude $\theta$ of the point of departure. This he accomplishes by means of respective manual control knobs 31 and 37, which operate through respective mechanical connections $\phi$–M and $\theta$–M digital latitude and longitude indicators 32 and 38. Subsequently the $\phi$ and $\theta$ shaft position signals are under control of the latitude computer 30 and longitude computer 36 respectively. These operate the respective control knobs and indicators to provide continuous latitude and longitude indication of the aircraft.

At this time the switch 18 (FIG. 5) will normally be in the hold position so that the XYP relay will be energized and the X and Y computers 13–X and 13–Y (FIG. 7) will be slaved to the computers 36 and 30 by reason of the fact that the X and Y computers receive respective error signals through the indicated NO contacts of the relay. The instructor will insert the map 11a in a frame 49, and will insert the following map and projection constants: chart central longitude $\theta_c$ by means of a calibrated control knob 51 (FIG. 8), a factor $h$ which is a function of the standard parallels of the projection by means of a calibrated control knob 53 (FIG. 8), the chart minimum scale latitude $\phi_0$ by means of a calibrated control knob 56 (FIG. 9), the minimum scale factor K by means of a calibrated control knob 80 (FIG. 9), the quantity $\rho_0$ by means of a calibrated control knob 84 (FIG. 9), and the quantity $\rho_c-\rho_0$ by means of a calibrated control knob 88 (FIG. 9). The insertion of these chart and projection constants uniquely determines the origin of the XY system at the center of the chart 11a and places the pen block 48 at the location of the aircraft take-off. This will be apparent from subsequent considerations. The chart and map constants will generally appear as part of the map legend or may be supplied to the instructor in the form of tables. The insertion of the map and chart constants will also uniquely determine the positions of a meridian tilt ($\delta$) position servo 40 (FIG. 7) and of a scale factor ($d\rho/dz$) position servo 43, which assume positions corresponding to the meridian tilt and scale factor values applicable to the point of departure. This will also be apparent from subsequent considerations. Visual indication of the meridian tilt and scale factor is provided by means of digital indicators 41 and 44 which are driven by the $\delta$ and $d\rho/dz$ shaft position signals.

Initially also the instructor had closed switch 22 (FIG. 5) to assure deenergization of the pen drop solenoid PDS. Accordingly as the pen block 48 (FIG. 7) is positioned to the point of departure no spurious trace will appear on the map 11a. The structural arrangement of the pen and pen solenoid is omitted, as it forms no part of the present invention. For a description thereof, reference is made to the co-pending application of Milton Eisenstark for "Dual Course Recorder," Serial No. 836,-387, filed August 27, 1959, now Patent No. 2,948,580, dated August 9, 1960.

When the pen block 48 arrives at the point of departure, the instructor will open switch 22 (FIG. 5) thereby energizing the pen drop solenoid PDS to prime the same for continued plotting. He will also throw the switch 18 (FIG. 5) to its "normal" position to deenergize the XYP relay. The OM and LE relays are deenergized at this time in view of the on map condition of the pen and because of the absence of any error. The X and Y computers are now ready to integrate, whereas the latitude and longitude computers 30 and 36 now receive latitude and longitude error signals $\phi$E and $\theta$E respectively through the indicated NC contacts of the OM relay. The derivation of the $\phi$E and $\theta$E signals will be described subsequently. Thus the computers 30 and 36 are both slaved to the X and Y computers 13X and 13Y. The computers 30 and 36 are now primed to function as position servos, although they still receive integrand inputs.

As the flight takes off, a flight computer 29 delivers North-South and East-West ground speed signals V–NS and V–EW of non-zero value. These signals may be generated as shown in the Steiner patent for example. The V–NS signal is applied as a latitude velocity V–$\phi$ integrand input signal to the latitude computer 30. The conversion from miles per hour to degrees per hour is straightforward because of the linear relation of the two velocities. The latitude computer integrates this signal with respect to time to deliver electrical and shaft output signals $\phi$. The computer is slaved to the X and Y computers by virtue of application of the $\phi$–E signal.

The signal V–EW is applied as an input signal to a longitude velocity computer 33 which converts the input velocity V–EW expressed in miles per hour to a longitude velocity V–θ expressed in degrees per hour. The relation of input to output is, (1) $$V-\theta = \frac{V-EW}{\cos \phi}$$

This computation is performed by well known division techniques. The latitude computer 30 applies the shaft position signal $\phi$ to a sine-cosine inductive resolver 35, which also receives the reference input voltage —E. Resolver 35 delivers output voltage —cos $\phi$ to a multiplier 34 that also receives shaft input signal V–θ from the computer 33. The output signal —V–θ cos $\phi$ of the multiplier 34 is applied as the answer signal to the computer 33. This computer therefore lacks an internal answer signal.

The longitude computer 36 integrates the signal V–θ and accordingly delivers electrical and shaft output signals θ. This computer is slaved to the X and Y computers by virtue of application of the θ–E signal. As the computers 30 and 36 operate continuous latitude and longitude indication is given by the indicators 32 and 38.

The V–NS and V–EW signals are also applied to an inductive resolver 39, which further receives the shaft input signal $\delta$ and delivers output signals V–XU and V–YU which are as yet not fully corrected, but only partially corrected for earth curvature effects. The partial correction performed by resolver 39 takes into account the meridian tilt structurally and functionally in the same manner as performed by element 34 of the Steiner patent. The expressions for the output voltages are:

(2) $V-XU = V-EW \cos \delta - V-NS \sin \delta$ (3) $V-YU = V-EW \sin \delta + V-NS \cos \delta$ The output signals of resolver 39 are further processed in analogous X and Y channels. The X channel will be described in detail whereas the Y channel is described implicitly by the substitution of Y for X as applied to the X channel. The signal V–XU is applied to a multiplier 42X which also receives the scale factor shaft signal $d\rho/dz$ and delivers output voltage V–X fully corrected for both meridian tilt and scale factor. The signal V–X is applied as the integrand input signal to the X computer 13–X whose other input is presently grounded through the indicated NC contact of the XYP relay. The shaft output signal X is applied to a lead screw 46X, which drives a bearing block 47, which supports the Y lead screw 46Y, on which is mounted the pen block 48. Motion of the lead screw 46X displaces the lead screw 46Y and the pen block 48 in unison in the horizontal direction. At the same time the rotation imparted to the lead screw 46Y displaces the pen 48 in a vertical direction. In this manner the flight path is traced out on the map 11a. The lead screws are provided with respective disks 45X and 45Y which serve as mechanical stops to limit movement of the blocks 47 and 48. The disks are rigidly coupled to their respective lead screws. The block 47 of itself serves as a second limit stop for the block 48, while a stationary bearing block 50 serves as a second limit stop for the block 47. As an alternative to the lead screw drive a tape and pulley drive may be employed as shown in the above mentioned Eisenstark patent.

The flight path is plotted continuously until one of the four map limits is reached. If the upper map limit is reached first, the block 48 will be stopped by the block 47. The Y computer continues to integrate, but the mechanical shaft output will now remain fixed and since the electrical output —Y is due to the mechanical shaft output, it too will attain a limiting value; this is apparent from a consideration of FIG. 6. Referring also to FIG. 3, it is seen that the Y–OM and therefore the OM relays will now be energized. The cam 14Y will position the contact 15Y to the off map position but will move no further, as it too is driven by the connections Y–M. Referring to FIG. 5, with the energization of the OM relay, the XYP relay is also energized. Accordingly the lower inputs of the computers 30 and 36 are transferred to ground through the indicated NO contacts of the OM relay, and at the same time the lower inputs of the computers 13X and 13Y are connected to their respective error signals through the indicated NO contacts of the XYP relay. The latitude and longitude computers now function as pure integrators and as masters for the Y and X computers which now receive position error sginals in addition to their integrand signals.

The aircraft is now within the upper vertical extension of the map. If the instructor does nothing further, the pen 48 will track along the upper horizontal edge of the frame 49, assuming that the flight path has a horizontal component. The pen may now continue to trace along such limiting edge until the error signal is sufficiently large to energize the LE relay, whence the pen drop solenoid is deenergized and the pen is lifted from engagement with the map 11a. The pen block 48 will continue to travel until the aircraft leaves the horizontal map extensions as reflected by engagement of the block 47 with stops 45X or 50. Thus the pen block comes to rest in one of the four corners of the map when the aircraft is outside of both the horizontal and vertical map extensions. It is obvious that an entirely analogous set of events would have taken place had any of the other three limiting conditions been first reached. Whether an X or a Y limit is reached first, ultimately the second limit will be reached, and both the X–OM and Y–OM relays will be energized and the pen drop solenoid PDS will be deenergized.

The description so far has been slanted towards use of the invention with a flight simulator for navigational training in the sense that reference has been made to instructor, student, and training exercise. This will be continued. However, it should be understood that the invention may be used in connection with actual airplanes. For example the invention could be used by the navigator, who would do whatever both the instructor and student are called on to do. As another example the invention could be used for ground recording on the basis of data received from the aircraft via radio communication.

As the pen 48 approaches or reaches the first limit, say again engagement of blocks 47 and 48, or the second limit, namely one of the four corners of the map, the instructor may do one of the following:

(1) He may remove map 11a and replace it by another map that geographically overlaps the first map. He will then insert new map constants, and possibly even new projection constants. This will result in large error, the pen 48 will be lifted, and will be caused to travel to the location required by the new map. Also because of the large error, the XYP relay will be energized or will continue to be energized as the case may be, until the pen finds its required location. During this time interval the latitude and longitude computers will act as masters and the X and Y computers as slaves. As soon as the large error condition is removed, the pen will drop once more to resume plotting; consequently the XYP relay will be deenergized. Since there is an on map condition again, the off map relay will be deenergized. At this point the X and Y computers resume as masters and the latitude and longitude computers resume as slaves, and plotting continues as before. This procedure may be repeated over any number of succession of maps until the flight lands.

(2) The instructor may not require any further plotted record of the flight. In this case he does nothing more. The latitude and longitude computers continue to operate as masters and the indicators 32 and 38 continue to reflect latitude and longitude respectively. The pen block 48 comes to a stop by engagement of either block 47 or of disk 45Y, assuming that the flight continues within the confines of the vertical extensions of the map. If the flight path also has a horizontal component, the pen will wind up at one of the four corners of the map.

(3) The instructor may replace the original map 11a with another one that represents a more remote area and has no geographical overlap with the original map. This would be a map covering an area which the aircraft is expected to traverse later on. The instructor will insert the newly required map constants or even projection constants, and the pen 48 under the influence of error signals applied to the X and Y computers, will travel to that corner of the map, or to that edge of the map which is nearest to the position of the aircraft. Thus the plotting equipment is prepared for renewed plotting. Under these circumstances the error is large and the pen will be lifted, avoiding any spurious trace. The pen will remain in the just assumed location until the flight path enters one of the horizontal or vertical extensions of the chart. At this time the pen will track along one of the edges in accord with the flight path in the particular extension. Finally, the flight path enters the map area. At this point the X and Y computers will become masters once more and the latitude and longitude computers slaves once more and the further events are as before.

It should be appreciated that the instructor may adopt alternative (3) after events have taken place along the lines of alternatives (1) or (2). Additional possible modes of successive operations may be evolved from a succession of the above three alternatives. These are obvious from the preceding description, and need not be further described.

To complete the description of FIG. 7, it should be noted that the motor windings of the computers 30 and 36 may be short-circuited through the indicated NO contacts of the $\theta\phi L$ relay. Similarly the motor winding of the X and Y computers may be short-circuited through the indicated NO contacts of the XYL relay. When the computers 30 and 36 act as masters their respective lower inputs are grounded through the indicated NO contacts of the OM relay, and when acting as slaves the $\phi E$ and $\theta E$ signals are applied to such lower inputs through respective NC contacts of the OM relay. When the X and Y computers act as masters their respective lower imputs are grounded through the respective indicated NC contacts of the XYP relay, and when acting as slaves the lower inputs receive the X-E and Y-E signals through the respective indicated NO contacts of the XYP relay.

*Computation of Earth Curvature Correction Factors and Error Signals (General)*

As briefly explained in the introductory part of the specification, the approach of the present invention is to compute the earth curvature correction factors as dependent variables of either the latitude and longitude signals, or the X and Y signals, whichever are masters, and then recompute slave signals as dependent variables of the computed earth curvature correction factors. The recomputed slave signals are compared with the corresponding original slave signals and are applied as comparison error signals to the respective slave computer. This approach will now be explained in greater detail.

The meridian tilt angle $\delta$ may be expressed in terms of the longitude as follows:

(4) $\quad\quad\quad \delta = h(\theta - \theta_c) = h\Delta\theta$

The new constant $h$ arises out of the manner in which the Lambert projection is created, referring to FIGS. 1 and 2. It is a function of the standard parallels of the projection, and is given by (5) $\quad\quad h = \dfrac{\log \cos \phi_1 - \log \cos \phi_2}{\log \tan \dfrac{z_1}{2} - \log \tan \dfrac{z_2}{2}}$ The angles $z$ are the complements of the corresponding angles $\phi$. It will be convenient to utilize the angles $\phi$ and $z$ concurrently hereinafter.

The scale factor computation is based on the relation of $\rho$ and $z$. For $\rho_0$ this is given by (6) $\quad\quad\quad \rho_0 = K \tan z_0 = K \cot \phi_0$ The relation of $\rho$ and $\phi$ more generally is given by (6a) $\quad\quad \rho = \rho_0 - K \tan(\phi - \phi_0) = \rho_0 - K \tan \Delta\phi$ or $$\rho - \rho_0 = -K \tan \Delta\phi$$

$K$ is the aforementioned minimum scale factor, given by the expression (7) $\quad\quad K = \dfrac{\left(\tan \dfrac{z_0}{2}\right)^h \sin z_1}{\left(\tan \dfrac{z_1}{2}\right)^h \sin z_0}$ From Equation 6a, there follows at once the expression for the scale factor (8) $\quad\quad d\rho/dz = d\rho/d\phi = K \sec^2 \Delta\phi$ Equations 4 and 6 express the variables $\delta$ and $\rho$ as functions of longitude and latitude. These variables may also be expressed in terms of X and Y as follows, referring to FIG. 2:

(9) $\quad\quad\quad X = \rho \sin \delta$

(10) $\quad\quad\quad Y = \rho_c - \rho \cos \delta$

The approach of the invention, under "on map" conditions is to solve Equations 9 and 10 for $\rho$ and $\delta$ as dependent variables of the actual X and Y variables. The term "actual" as used in the proper context is intended to connote a variable obtained at the output of the respective computer producing the same, here the output signals of the X and Y computers, as distinguished from the recomputed variables with which the actual variables are compared to form the error signals.

The solutions of $\rho$ and $\delta$ as dependent variables of X and Y under "on map" conditions are used to recompute the variables $\theta$ and $\phi$ in accordance with Equations 4 and 6a. The recomputed $\theta$ and $\phi$ variables are compared with the respectively corresponding actual variables to form the error signals, which are applied to the longitude and latitude computers to force them to agreement with the X and Y computers.

Under "off map" conditions, the reverse procedure is used. The variables $\delta$ and $\rho$ are obtained as dependents of the actual variables $\theta$ and $\phi$ in accordance with Equations 4 and 6a, and are used to recompute X and Y in accordance with Equations 9 and 10. In this manner, the earth curvature correction factors (including also $d\rho/dz$ as will be seen) are computed as dependents of the master variables and are used to recompute the slave variables for comparison with the actual slave variables, under both "off map" and "on map" conditions. This assures that the earth curvature correction factors and error signals are computed as most direct functions of the most accurate variables, namely the master variables. In this manner the slave computers are forced into agreement with the master computers most rapidly.

As pointed out in the introductory part of the specification, duplicate apparatus for computing the earth curvature correction factors under "off map" and "on map" conditions is not necessary. This will be seen by preliminary reference to FIGS. 8 and 9, wherein the actual variables are usually represented by negative signals, —X for example, and the recomputed variables are positive, and moreover carry the subscript R, $X_R$ for example.

The meridian tilt computer 40 (FIG. 8) receives, under "on map" conditions the $-X$ signal, and as an answer signal the recomputed $X_R$ signal. The latter is obtained in accordance with Equation 9 at the output of a multiplier 95 from which it is also applied to a summing amplifier 96, which also receives the actual $-X$ signal and delivers the X–E signal. However under "on map" conditions the X–E signal is not applied to the X computer as explained in the description of FIG. 7. The X–E signal is applied to the X computer under "off map" conditions; in this case the meridian tilt computer 40 receives as input signal the $-\delta$ signal, and as answer signal the signal $\delta_R$. The latter "recomputed" $\delta$ signal is used to produce the recomputed longitudinal signal $\theta_R$ at the input of a summing amplifier 96', which also receives the actual longitude signal $-\theta$, and accordingly produces the longitude error signal $\theta$–E. The latter is not applied to the longitude computer 36 under "off map" conditions; it is applied to computer 36 under "on map" conditions through the indicated contact of the OM relay (see also FIG. 7). Thus the recomputed X, $\delta$ and $\theta$ signals are generated under both "on map" and "off map" conditions; this is also true of the X and $\theta$ error signals. Under "on map" conditions the $\theta$–E signal is applied to the longitude computer 36, the X–E signal is not applied to the X computer, and the recomputed X signal serves as answer signal for the meridian tilt computer 40. Under "off map" conditions, the X error signal is applied to the X computer, the $\theta$–E signal is not applied to the longitude computer 36, and the $\delta_R$ signal serves as answer signal for the meridian tilt control 40. The computation of the variables $\rho$, $d\rho/dz$, $Y_R$, $\phi_R$, Y–E and $\phi$–E in FIG. 9 parallels in principle the computation of the apparatus of FIG. 8. However, it is somewhat more complex and will be deferred at this time. The complexity arises out of the fact that the Equations 4, 6a and 8 to 10 are not used in exactly the form presented above. Best accuracy is obtained by rearrangement of the equations for purposes of mechanization, as will now be explained.

The accuracy of computation of Equation 8 is improved by expanding the expression for $d\rho/dz$ in a power series, terminating with a fifth power term in $\Delta\phi$ as expressed in

(11)
$$d\rho/dz = K\left[1 + \frac{\Delta\phi^2}{2} + \frac{\Delta\phi^3}{6}\tan\phi_0 + \frac{\Delta\phi^4}{24}(3\tan^2\phi_0 + 5) + \frac{\Delta\phi^5}{120}(12\tan^3\phi_0 + 21\tan\phi_0)\right]$$

The parameter $\rho$ is not necessary for the scale factor computation, but is necessary for the computation of the error signals, described subsequently. Since many of the terms computed for $d\rho/dz$ are also utilized in the computation of $\rho$ the description of the latter computation will be included with the description of the computation of $d\rho/dz$. Equation 6a is not in a most suitable form for precise computation of $\rho$. Again a power series expansion in terms of $\Delta\phi$ increases the precision, as given in

(12)
$$\rho - \rho_0 = -K\left[\Delta\phi + \frac{\Delta\phi^3}{6} + \frac{\Delta\phi^4}{24}\tan\phi_0 + \frac{\Delta\phi^5}{120}(3\tan^2\phi_0 + 5) + \frac{\Delta\phi^6}{720}(12\tan^3\phi_0 + 21\tan\phi_0)\right]$$

Equation 12 substitutes the variable $\rho - \rho_0$ for the variable in Equation 6a. Again the incremental form of $\rho - \rho_0$ is preferred as more accurate. The power series is terminated with the sixth power term of $\Delta\phi$. Depending upon the accuracy desired, and also on the contemplated range of operation of the computing system, the power series of Equations 11 and 12 may be terminated with higher or lower order terms.

For convenience in the description, the several terms utilized in Equations 11 and 12 and the alphabetic signals respectively representing these terms, are presented in the following Table I.

TABLE I

| Mathematical Expression or Signal Equivalent | Signal |
|---|---|
| $\Delta\phi$ | PA |
| $\frac{\Delta\phi^2}{2}$ | PB |
| $\frac{\Delta\phi^3}{6}$ | PC |
| $\frac{\Delta\phi^4}{24}$ | PD |
| $\frac{\Delta\phi^5}{120}$ | PE |
| $\frac{\Delta\phi^6}{720}$ | PF |
| $\tan\phi_0$ | PG |
| $3\tan^2\phi_0$ | PH |
| $12\tan^3\phi_0$ | PI |
| $21\tan\phi_0$ | PJ |
| PH+5 | PK |
| PI+PJ | PL |
| PC×PG | PM |
| PD×PK | PN |
| PE×PL | PO |
| PD×PG | PP |
| PE×PK | PQ |
| PF×PL | PR |

The alphabetic signals apply both to shaft position and electrical signals. In the drawings the mathematical terms and corresponding signals are indicated together. On this basis Equations 11 and 12 may be rewritten respectively as

(13) $\quad \delta\rho/dz = K[1 + PB + PM + PN + PO] = K \cdot QA$

(14) $\quad \rho - \rho_0 = -K[PA + PC + PP + PQ + PR] = -K \cdot QB$

The new terms QA and QB are the signals corresponding to the bracketed expressions in Equations 13 and 14 respectively. For purposes of the present invention it will be convenient to re-express the term $-K \cdot QB$ as $-K \cdot PA - K \cdot QC$, where the new term QC represents the sum of the terms PC, PP, PQ and PR.

Similar considerations prevail with respect to Equations 9 and 10. Since it is more accurate to utilize the variable $\rho - \rho_0$ in place of $\rho$ Equations 9 and 10 may be preliminarily reexpressed as

(15) $\quad X = [(\rho - \rho_0) + \rho_0]\sin\delta$

(16) $\quad Y = \rho_c - [\rho - \rho_0) + \rho_0]\cos\delta$

As a further step in improving the precision of computation of Equation 16, the term $\rho_c$ is reexpressed in the form of $\rho_c - \rho_0$ leading to

(17) $\quad Y = (\rho_c - \rho_0) - (\rho - \rho_0) + [(\rho - \rho_0) + \rho_0][1 - \cos\delta]$ Even as reexpressed in the form of Equation 17, the accuracy of computation is not the best, for Equation 17 is still in essence the same as Equation 14 and as such represents the difference of two large numbers, very nearly equal, and involving a continuous variable, namely $\rho$. It might be noted that the same objection may be applied to other parenthetical terms of Equation 17. However the first term on the right hand side thereof, $\rho_c - \rho_0$ represents only constants and can be inserted as the ultimate difference rather than subtraction of the two numbers. The second and also the third parenthetical terms on the right hand side of Equation 17 namely $\rho - \rho_0$ are also computed as the ultimate difference, rather than by subtraction of two parameters.

In order to obviate the necessity for subtracting two numbers very nearly equal, cos δ is reexpressed in power series form terminating with the sixth power term as

(18) $$\cos \delta = 1 - \frac{\delta^2}{2} + \frac{\delta^4}{24} - \frac{\delta^6}{720}$$

It should be noted that the objectionable subtraction of two numbers very nearly equal resides in the last bracketed term of Equation 17, namely 1−cos δ. This may be eliminated by substituting the expression for cos δ of Equation 18 in Equation 17 to result in

(19) $$Y = (\rho_c - \rho_0) - (\rho - \rho_0) + [(\rho - \rho_0) + \rho]\left[\frac{\delta^2}{2} - \frac{\delta^4}{24} + \frac{\delta^6}{720}\right]$$

The power series type of expression is preferred for the further reason of higher computation accuracy. For this reason sin δ is also expressed in power series form, terminating with the fifth power term as

(20) $$\sin \delta = \delta - \frac{\delta^3}{6} + \frac{\delta^5}{120}$$

Then, substituting the expression for sin δ of Equation 20 in Equation 15, there results

(21) $$X = [(\rho - \rho_0) + \rho_0]\left[\delta - \frac{\delta^3}{6} + \frac{\delta^5}{120}\right]$$

As a matter of convenience, the power series terms of δ are tabulated side by side with the signals representing them.

TABLE II

| Mathematical Expression or Signal Equivalent | Signal |
|---|---|
| $\delta$ | OA |
| $\frac{\delta^2}{2}$ | OB |
| $\frac{-\delta^3}{6}$ | OC |
| $\frac{-\delta^4}{24}$ | OD |
| $\frac{\delta^5}{120}$ | OE |
| $\frac{\delta^6}{720}$ | OF |
| OA+OC+OE | OG |
| OB+OD+OF | OH |

Reverting to the preliminary consideration of FIG. 9, a $\rho - \rho_0$ computer 87 receives the (actual) −Y signal under "on map" conditions, and also the recomputed Y signal. The latter is obtained at the output of a summing amplifier 92, from which it is also applied as an input signal to a summing amplifier 93, which further receives the −Y signal and accordingly delivers the Y−E signal. Under "off map" conditions, the computer 87 receives as input signal, the signal $-(\rho - \rho_0)$, and as answer signal a "recomputed" $\rho - \rho_0$ signal. The $Y_R$ and Y−E signals are thus generated under both "on map" and "off map" conditions, but the Y−E signal is applied to the Y computer only under "off map" conditions (see FIG. 7). Under "on map" conditions the channel including the units 87 and 92 solves Equation 10, as modified in Equation 19, for ρ as a dependent variable of the master variable Y, and under "off map" conditions for the recomputed Y as a dependent variable of ρ. It should be recognized that the solutions for Equations 9 and 10, as modified by Equations 19 and 21, is simultaneous since two independent and two dependent variables are involved in either condition.

The recomputed $\rho - \rho_0$ signal is further applied to a computer 92' to obtain a recomputed Δϕ signal in accordance with Equation 12, as reexpressed in Equations 14 and 14a. The $\Delta\phi_R$ signal is converted to a recomputed ϕ signal at the output of unit 55'. The $\phi_R$ signal is compared with the actual −ϕ signal in unit 93' and the resultant ϕ−E signal is applied to the latitude computer 30 under "on map" conditions (see also FIG. 7). Thus the $Y_R$, Y−E, $\Delta\phi_R$, $\phi_R$ and ϕ−E signals are computed under both "on map" and "off map" conditions to assure rapid stabilization upon transfer from one condition to the other. This was also the reason for computing the $X_R$, X−E, $\theta_R$ and θ−E signals under both conditions. However, the Y−E signal is applied to the Y computer only under "off map" conditions, and the ϕ−E signal is applied to the latitude computer 30 only under "on map" conditions.

As stated above, the recomputed $\rho - \rho_0$ signal is used to arrive at the recomputed Δϕ signal in accordance with Equation 12. This equation however also includes higher power terms of Δϕ and terms including tan $\phi_0$ and higher powers thereof. In other words, the unknown Δϕ is obtained in terms of functions, herein higher powers of such unknown Δϕ. This poses no problem for the computer, which solves for Δϕ in accordance with the following computing philosophy. Assuming that we have obtained the unknown Δϕ we generate its higher powers, and combine them with the known recomputed $\rho - \rho_0$ in accordance with Equation 12, as reexpressed in the form of Equation 14, to obtain the unknown Δϕ. All that is necessary is to form a closed loop. The variables δ and ρ are computed under "off map" conditions in analogous manner. As previously stated, the −X signal is applied to the meridan tilt computer 40 to obtain a solution for δ in accordance with Equation 9 as reexpressed in Equation 21. Then using the obtained δ whose solution is being sought, the necessary functions of δ are generated to satisfy Equation 9 or 21 and the recomputed X signal is obtained and inserted in the answer loop of the computer 40.

For an appreciation of how this technique is applied to the solution for $\Delta\phi_R$, it is best to begin with the open loop mechanization of Equation 12 or 14, that is its solution for $\rho - \rho_0$ under "off map" conditions. The "actual" Δϕ signal is obtained at the output of unit 55 and is applied to a power series generator 57a and also to a multiplier 82'. Unit 57a generates the higher powers of Δϕ needed in the expressions of Equations 11 and 12 and delivers them to multipliers 70a which also receive signals representing tan $\phi_0$ and its higher powers (all constants) and accordingly delivers the product signals PM to PR used in Equations 13 and 14. Signals generated by the units 57a and 70a are applied to a summing amplifier 81 to generate the QC signal, which is applied to a multiplier 82 located below multiplier 82'. It is seen that the summation of the signals applied to the multipliers 82 and 82' constitutes the QB signal (Equation 14). The summation, however, is not performed until subsequent to individual multiplication by the factor K, so that separate KΔϕ and K·QC signals are made available. These are summed by a summing amplifier 81' to obtain the actual $\rho - \rho_0$ signal. The necessity for obtaining the separate K·QC signal will be apparent from the consideration of the solution for the recomputed Δϕ, which now follows. The $\Delta\phi_R$ signal is obtained ultimately at the output of unit 92', as previously stated. Using the recomputed, rather than the actual Δϕ signal under "on map" conditions, the higher powers of Δϕ are generated by the unit 57a as before, and accordingly the multipliers 70a deliver the same product terms as before, but based on the now more accurate recomputed Δϕ. Unit 81 delivers to the multiplier 82 once more the QC signal, but this is now based on the now more accurate recomputed Δϕ signal. Also, multiplier 82' now receives the recomputed rather than the actual Δϕ signal. The K·QC signal is still combined with the KΔϕ signal, now also recomputed and therefore more accurate to produce $\rho - \rho_0$. This is done to prepare for smooth transition to "off map" conditions, as the $\rho-\rho_0$ signal is not presently applied to the computer 87. The K·QC signal is also applied to the computer 92' thereby closing the loop to give rise with the presently most accurate recomputed $\rho-\rho_0$ signal to the recomputed $\Delta\phi$ signal with which we began. Again the application of signal to the computer 92' is made permanent, even though ultimately used only under "on map" conditions, in order to assure smooth and rapid transition between the two conditions.

The signals obtained at the units 57a and 70a are also applied to a summing amplifier 78 to compute ultimately the scale factor by means of computer 43, in accordance with Equation 11 as reexpressed in Equation 13. The signals applied to unit 78 are derived from which ever of the two $\Delta\phi$ signals is more accurate, namely from the actual $\Delta\phi$ signal under "off map" conditions, and from the recomputed $\Delta\phi$ signal under "on map" conditions. This follows at once from the alternative energization of the power series generator 57a.

The apparatus of FIGS. 8 and 9 will now be considered in greater detail. As previously stated, units which are the same or essentially the same as those of the Zahner et al. application, are designated by the same, unprimed reference numerals used in the apparatus of the Zahner et al. application. The units added by the present invention are identified by primed reference numerals, and generally perform a function that parallels the function of a unit designated by an unprimed reference numeral. In this manner, it can readily be determined that relatively few additional blocks are needed to convert the Zahner et al. apparatus to that of the present invention, and yet the transition from "on may" to "off map" conditions, and vice versa, and also the falling and remaining in step of the slave computers with the master computers is speeded up appreciably. The improvement in dynamic response is due to the fact that the intermediate and ultimate recomputed variables, including the earth curvature correction factor and error signals are computed as most direct dependents of the master variables under both "on map" and "off map" conditions.

The fact that relatively few additional computing units are needed, and that essentially the same channels are used for computing the intermediate and ultimate variables under both "on map" and "off map" conditions, enables ready modification of the Zahner et al. application, without the necessity of extensive redesign.

*Computation of Meridian Tilt, and $\theta$ and X Error Signals (FIG. 8)*

It will be recalled that under "on map" conditions, the meridian tilt computer 40 receives an input and answer signals the actual and recomputed X signals $-X$ and $+X_R$. These signals are applied through indicated NC contacts of the OM relay. Under "off map" conditions, the computer 40 receives as input and answer signals the actual and recomputed $\delta$ signals $-\delta$ and $\delta_R$. These signals are applied through indicated NO contacts of the OM relay. The $\delta_R$ signal is obtained at the output of the computer 40, which has no internal answer loop.

The "actual" $-\delta$ signal is derived from the longitude computer 36 in the following manner, as a solution of Equation 4 as a dependent of $\theta$. Shaft position signal $\theta$ is obtained from the longitude computer 36 and is applied as an input signal to a synchro-differential subtracter 52 which also receives shaft position signal $\theta_c$ obtained from a calibrated control knob 51, that is provided with a dial graduated in terms of chart central longitude. The subtracter 52 also receives input reference voltage $-E$ and delivers output signal $-\Delta\theta$ which is applied to the upper end of a linear potentiometer 54 whose lower end is grounded. A calibrated control knob 53 is provided with a scale graduated in terms of $h$, which incidentally varies intermediate of the indicated limits of zero and one. The shaft position signal $h$ is derived from knob 53 and is applied to the slider of the potentiometer 54 to obtain input signal $-h\Delta\theta$ for the meridian tilt position servo 40, which in turn produces shaft position and electrical outputs $\delta$. The manner of generating the signal $-h\Delta\theta$ is typical of the multiplication technique used herein.

The $\theta$-E signal is obtained by an essentially reverse solution of Equation 4. Here we begin with the $\delta_R$ signal, which is applied to a position servo 40' which divides $\delta_R$ by $h$. This is accomplished by applying the electrical output signal of servo 40' as an input signal to a multiplier 54', which also receives the shaft position $h$ signal from knob 53, and delivers a $-\delta_R$ signal, which serves as answer signal for the servo 40'. It should be noted that the units 40' and 54' are structurally similar to the units 40 and 54 respectively, so that the computations in the forward and in the reverse directions are performed with equal accuracy. This is also true of a subtracter 52' that corresponds to subtracter 52, and accordingly is in the form of a synchro-differential.

Subtracter 52' accepts the reference voltage $-E$, shaft position signal $\theta_c$ from control knob 51 and shaft position signal $\delta_R/h$ from computer 40'. The latter shaft position signal is taken as negative, so that a positive $\theta_R$ signal may be realized by subtracting $\theta_c$ from $-\delta_R/h$ in accordance with Equation 4. The negative shaft position output signal of computer 40' may be readily obtained by use of a suitable reversing gear. The $\theta_R$ signal is applied as an input signal to a summing amplifier 96', which also receives electrical $-\theta$ signals from the longitude computer 36, and accordingly delivers the $\theta$-E signal to the longitude computer under "on map" conditions through the indicated NC contact of the OM relay.

The meridian tilt computer 40 delivers electrical and shaft position $\delta$ signals to power series generator 97a, which may be the same as the units 97 to 102 of the Zahner et al. application. Unit 92a delivers the signals representing the powers of $\delta$ appearing in Equations 19 and 21. Its output signals OA, OC and OE are summed by means of summing amplifier 94, which accordingly delivers the OG signal to a multiplier 95. Unit 95 also receives shaft position $\rho$ signal from the apparatus of FIG. 9, and accordingly delivers the $X_R$ signal for use as an answer signal of the meridian tilt computer 40 under "on map" conditions, and also as an input signal to a summing amplifier 96. Amplifier 96 also receives the actual $-X$ signal and delivers the X-E signal. The summing amplifiers 96 and 96' are structurally similar for equal precision in computation.

The $\rho$ signal is derived from the apparatus of FIG. 9, and at the same time generators 97a supply the OB, OD and OF signals to the apparatus of FIG. 9. In this manner Equations 9 and 10, as reexpressed in Equations 19 and 21 are solved simultaneously, for X and Y under "off map" conditions, and for $\rho$ and $\delta$ under "on map" conditions.

*Computation of Scale Factor, and of Y and $\phi$ Error Signals (FIG. 9)*

A convenient starting point for the description of FIG. 9 is the generation of the $\Delta\phi$ signal. The latitude computer 30 delivers the shaft position $\phi$ signal to a synchro-differential subtracter 55, which also receives reference voltage $-E$ and shaft position signal $\phi_0$, which is inserted by means of a calibrated control knob 56 by the instructor. The output signal of subtracter 55 is applied through the indicated NO contact of the OM relay to power series generators 57a, which may be the same as the units 57, 58 and 60 to 64 of the apparatus in the Zahner et al. application. Generators 57a deliver the signals PB to PF, which represent the higher powers of $\Delta\phi$ in Equations 11 and 12, to a group of multipliers 70a, which may be the same as the units 70, 71 and 74 to 77 of the Zahner et al. application. Multipliers 70a accept the signals PH to PL from power series generators 66a, which generate the corresponding powers of tan $\phi_0$ used in Equations 11 and 12. Block 70a accordingly delivers the signals PM to PR used in Equations 13 and 14.

Block 66a may be the same as the units 66 to 69 and 72, 73 of the Zahner et al. application. Its PG input signal is generated in the following manner. Control knob 56 delivers shaft position signal $\phi_0$ to a tangent function generator 65, which also accepts reference voltage +E and accordingly delivers the PG signal. Generator 65 may be in the form of a potentiometer with a contour suitable for obtaining the tangent function.

The PA input signal to the power series generator 57a is formed of the actual $\Delta\phi$ signal, as just described, under "off map" conditions. Under "on map" conditions, the PA signal is formed of the then more accurate recomputed $\Delta\phi$ signal applied through the indicated NC contact of the OM relay. Accordingly, the signals PM to PR are based on the actual or recomputed $\Delta\phi$ signals, depending upon conditions with respect to the map. This is also true of the signals PB to PF.

The PB, PN and PO signals are applied as input signals to a summing amplifier 78, along with a further input signal 1 representing the constant in the bracketed term of Equation 13. The signal 1 may be obtained from the reference voltage +E applied through a suitable voltage divider, for example, or by proper selection of the associated summing resistor. Accordingly, amplifier 78 delivers the QA signal to an input of a multiplier 79, which also receives shaft position K signal from a calibrated control knob 80. Multiplier 79 delivers the signal $d\rho/dz$ to the scale factor position servo 43. The scale factor signal is thus the most direct dependent of the actual Y or actual $\phi$ signal, whichever is master.

The PC, PP, PQ and PR signals are applied as input signals to a summing amplifier 81, which accordingly delivers output signal QC to a multiplier 82, which also receives the shaft position K signal from control knob 80, and accordingly delivers the K·QC signal to a summing amplifier 81' and also to the $\Delta\phi_R$ servo 92'. The summing amplifier 81' also receives the K$\Delta\phi$ signal from multiplier 82', which by analogy to unit 82 also receives the shaft position K signal from control knob 80 and the electrical PA signal. The PA signal is formed of the actual $\Delta\phi$ signal applied through the indicated NO contact of the OM relay, or of the recomputed $\Delta\phi$ signal, applied through the indicated NC contact of the OM relay. Therefore, the $\rho-\rho_0$ output signals of the summing amplifier 81' are computed as most direct dependent of the actual Y or $\phi$ signals, whichever is master.

Position servo 83 delivers shaft output signal $\rho$ to apparatus of both FIGS. 8 and 9 as the summation of a $(\rho-\rho_0)$ and a $\rho_0$ input signal. The former input signal is obtained from the output of summing amplifier 81' through the indicated NO contact of the OM relay, or from the output of position servo 87 through the indicated NC contact of the OM relay. Therefore the output signal of servo 83 is a most direct dependent of the actual Y or actual $\phi$ signal, whichever is master. The $\rho_0$ signal is derived from the slider of a potentiometer 85, the slider being subject to the shaft position signal $\rho_0$ derived from a calibrated control knob 84. Potentiometer 85 is energized by reference voltage +E at its upper end, and is returned to ground through a fixed resistor 86 from its lower end. Resistor 86 is provided as ground return, since the minimum value of $\rho_0$ exceeds zero.

Position servo 87 receives $\rho-\rho_0$ signal from summing amplifier 81' through the indicated NO contact of the OM relay, and concurrently as answer signal its own "recomputed" electrical output signal through the indicated NO contact of the OM relay. Alternatively, servo 87 receives as input signal the —Y signal, and as answer signal the $Y_R$ signal through respective NC contacts of the OM relay. Therefore, the output signal of servo 87 is a most direct dependent of the —Y or the —$\phi$ signal, whichever is master. Servo 87 has no internal answer loop.

A subtractor 89 is energized by the reference voltage —E, and receives the shaft position $\rho-\rho_0$ signal from servo 87, and shaft position $\rho_c-\rho_0$ signal from the calibrated control knob. The subtractor 89 delivers output signal $\rho_c-\rho$, constituting the combination of the first two parenthetical terms on the right hand side of Equation 19, as an input signal to summing amplifier 92. Unit 92 receives from a multiplier 91 a further input signal which represents the remaining term on the right hand side of Equation 19. The multiplier 91 generates its output signal as the product of shaft position $\rho$ signal derived from computer 83, and of electrical input signal OH. The OH signal is obtained at the output of a summing amplifier 90 as the summation of input signals OB, OD and OF obtained from the apparatus of FIG. 8. Summing amplifiers 92 delivers the recomputed Y signal, which is applied as answer signal to the servo 87 under "on map" conditions, and is also applied as input signal to a summing amplifier 93. Unit 83 also receives the —Y signal and accordingly delivers the Y–E signal.

Position servo 92' receives as input signals the K·QC signal from multiplier 82 and the "recomputed" $\rho-\rho_0$ signal from servo 87. The two input signals in summation constitute K$\Delta\phi_R$ (Equation 14). The reason for generating the QC and K·QC signals in a channel separate from that generating the K$\Delta\phi$ signal (adverted to in connection with Equation 14) is now apparent. The K·QC signal is based on the actual or the recomputed $\Delta\phi$ signal, whichever is more accurate. Its separate channeling permits combination, in summing amplifier 81', with the actual K$\Delta\phi$ signal to form the actual $\rho-\rho_0$ signal, and further permits combination, in servo 92', with the recomputed $\rho-\rho_0$ signal to form the recomputed $\Delta\phi$ signal.

Servo 92' functions as a divider of its input signals by K. It delivers positive and negative recomputed $\Delta\phi$ signals. The former is applied to multiplier 82' and power series generator 57a, as previously described. The latter is applied to a multiplier 82'', which also receives shaft position K signal from control knob 80, and accordingly delivers output signal —K$\Delta\phi_R$, which is applied as answer signal to the servo 92' to render it a divider. The multipliers 82, 82' and 82'' are made structurally alike to assure substantially equal accuracy of computation in the forward and reverse directions, and also to prepare for transfer from "on map" to "off map" conditions and vice versa with optimum speed and accuracy.

Computer 92' delievers shaft position signal $\Delta\phi_R$, taken as a negative signal, to a subtractor 55', which also accepts shaft position signal $\phi_0$ from control knob 56 and reference voltage +E. Subtracter 55' delivers output signal $\phi_R$ to summing amplifier 93', which also accepts the —$\phi$ signal and accordingly delivers the $\phi$–E signal. The indicated manner of generating the $\phi_R$ signal by way of subtracter 55' is preferred, as it matches the computation of the actual $\Delta\phi$ signal by means of the like subtracter 55. This is also in the interest of substantially equally accurate and equally rapid computation in the forward and reverse directions, and in preparation for transfer from "on map" to "off map" conditions or vice versa.

Before concluding this section, it is noteworthy to point out that in the apparatus of FIGS. 8 and 9 the OM relay is utilized exclusively for selection of computation channels. On the other hand, the computers 13X and 13Y utilize the XYP relay for selective application of error signals. The XYP relay, noting FIG. 5, is energized upon energization of not only the OM relay, but also upon energization of the LE relay or upon placement of switch 18 in the "hold" position. The exclusive use of the OM relay in the apparatus of FIGS. 8 and 9 is desirable for maintaining such apparatus in readiness for resumption of normal operation upon termination of the "large error" or "hold" conditions.

The apparatus of FIGS. 8 and 9 is especially adapted for modification of the corresponding apparatus of the Zahner et al. application, in the field if so desired. This arises out of the fact that for purposes of such modification it is merely necessary to add components (designated by primed reference numerals), without necessity of disturbing the pre-existing components and their interaction. The lone exception of this proposition is the separation of the QB signal into PA and QC signals (FIG. 9). However this very same feature of adaptability leads to duplication of some elements, and results in "stand-by" rather than active operation of some elements.

For example, the substracters 55 and 55' (FIG. 9) are duplicates. Further, the subtracter 55 operates actively only during "off map" conditions; it stands by during "on map" conditions to be ready to resume active operation subsequently. Similar considerations prevail with respect to the subtracter 55', elements 82, 82', 82'', 81', 92' of FIG. 9, and 52, 52' 54, 54' and 40' of FIG. 8. Also, the actual and recomputed X and Y signals are compared twice, and therefore their respective error signals are formed twice. One set of comparisons is performed by the summing amplifiers 96 and 93, and the other at the inputs of the meridian tilt and $\rho-\rho_0$ computers under "on map" conditions.

The duplication in generation of the X and Y error signals has been deliberately retained in the interest of adaptability to field modification of the Zahner et al. apparatus. It can be easily eliminated simply by placing unit 96 at the input of meridian tilt computer 40 and applying the X error signal to computer 40 under "on map" conditions, rather than the actual and recomputed X signals, and by similarly placing the unit 93 at the input of the $\rho-\rho_0$ computer 87. Accordingly it is intended that the claims be construed with this equivalence in mind.

The apparatus of FIG. 10, described in the next section, although not quite as compatible with that of the Zahner et al. application, advantageously eliminates all component duplication and stand-by operations.

*Alternate Earth Curvature Correction Factor and Error Signal Computation (FIG. 10)*

It will be recalled that in the apparatus of FIGS. 8 and 9 the channel providing the X and Y recomputed and error signals, additionally serves to provide a pair of feedback loops for the $\delta$ and $\rho-\rho_0$ computers under "on map" conditions. These computers receive as input signals the actual X and Y signals under such "on map" conditions. The apparatus of FIG. 10 repeats this approach and extends it to the latitude and longitude recomputation channel. This channel serves to provide a pair of feedback loops for the $\delta$ and $\rho-\rho_0$ computers under "off map" conditions; these computers receive as input signals essentially the actually computed longitude and latitude signals respectively, except that these signals are precombined with the corresponding recomputed signals to form the corresponding error signals. The net input signals to the $\delta$ and $\rho-\rho_0$ computers are therefore the X and Y error signals respectively under "on map" conditions, and the $\theta$ and $\phi$ error signals respectively under "off map" conditions in line with the concluding discussion of the preceding section.

In FIG. 10 the same reference numerals are used as were used in FIGS. 8 and 9, to identify like parts, to the extent practicable. The summing amplifier 96 accepts the actual and recomputed X signals and delivers the X–E signal through the indicated NC contact of the OM relay as input signal to the $\delta$ computer 40. Similarly, summing amplifier 93 accepts the actual and recomputed Y signals and delivers the Y–E signal through the indicated NC contact of the OM relay as input signal to the $\rho-\rho_0$ computer 87. The X and Y error signals under "on map" conditions thus serve as net input signals for the computers 40 and 87, and under "off map" conditions to slave the X and Y integrators of FIG. 7 to the latitude and longitude integrators, as previously. By "net input signal" is meant the combination of actually computed signal serving as input signal and recomputed signal serving as feedback signal. Thus the computers 40 and 87 still essentially receive the actually computed X and Y signals as input signals.

The $X_R$ and $Y_R$ signals are generated exactly as in the apparatus of FIGS. 8 and 9, namely in function generator unit 97b that accepts electrical and shaft position output signals from units 40 and 87. The function generators 97b include the units 94 to 96 and 97a of FIG. 8, and the units 83 to 92 of FIG. 9.

Summing amplifier 96' accepts the actual and recomputed $\theta$ signals and delivers the $\theta$–E signal through the indicated NO contact of the OM relay to computer 40. Similarly, summing amplifier 93' accepts the actual and recomputed $\phi$ signals and delivers the $\phi$–E signal through the indicated NO contact OM relay to the computer 87. The longitude and latitude error signals under "on map" conditions serve their previous corrective function in FIG. 7.

The $\theta_R$ signal is generated in a manner similar to that shown in FIG. 8. The servo 40' once again functions to divide $\delta$ by $h$. It accepts as input signal the electrical $\delta$ signal from servo 40 and delivers shaft position and electrical negative $\delta/h$ signals. The latter is applied as input signal to multiplier 54, which also receives shaft position $h$ signal from control knob 53, and accordingly delivers the $-\delta$ signal as answer or feedback signal to servo 40'. The shaft output signal of servo 40' is applied to the subtractor 52', which also receive shaft position $\theta_c$ signal from knob 51 and the $-E$ voltage as previously, and accordingly delivers the $\theta_R$ signal. The $\theta_R$ signal is fed back under "off map" conditions to the $\delta$ computer 40 as a component of the $\theta$–E signal. It should be noted that the elements 52' and 54 have no duplicates, and that they perform active functions under both "on map" and "off map" conditions, namely to produce the $\theta_R$ signal in either case. The $\theta_R$ signal in turn has a dual function, namely to generate the $\theta$–E signal as a corrective signal for the $\theta$ computer under "on map" conditions and as a feedback signal for the computer 40 under "off map" conditions. Similar considerations prevail with respect to the $\phi_R$ signal.

The $\phi_R$ signal is ultimately obtained in the same manner as in FIG. 9, namely from the subtracter 55' which accepts shaft position $\phi_0$ and $-\Delta\phi$ signals from control knob 56 and servo 92' respectively, and further accepts the $-E$ voltage. The $\phi_R$ signal also serves the dual function of feedback signal under "off map" conditions and corrective signal under "on map" conditions. The unit 55' is not duplicated, and moreover is active at all times along with servo 92'. The latter accepts the $\rho-\rho_0$ signal from computer 87, and is answered by a like, but negative signal obtained as the $-K \cdot QB$ signal. Thus the servo 92' is also provided with a feedback loop similar to that of FIG. 9, and the scale factor correction signal is obtained from such feedback loop.

The feedback loop for servo 92' includes function generators 57b, summing amplifier 81' and multiplier 82'. The function generators 57b include units 57a, 66a and 70a of FIG. 9. Unit 57b accepts the PA signal from servo 92' and the PG signal which may be generated in the same manner as in FIG. 9. It delivers at its lower terminal the input signals of summing amplifier 89 of FIG. 9, herein collectively designated as the QC signal, which is combined with the PA signal by amplifier 81' to produce the QB signal, here taken as a negative signal. The $-QB$ signal is multiplied by K in multiplier 82', which receives shaft position K signal from control knob 80. The resultant $-K \cdot QB$ signal is fed back as answer signal to servo 92'. It should be noted that the feedback channel is active at all times, since the servo 92' is active at all times to recompute the $\phi$ signal, which serves a dual function as stated. Also, in the apparatus of FIG.

10 it is not necessary to multiply the PA and QC signals by K separately, so that these signals may be combined in amplifier 81' before multiplication in the unit 82. This avoids duplicate multiplier 82'.

The function generators 57b also serve as a source of the scale factor correction signals. These are the signals delivered by its upper output terminal, which are the same as the alphabetic signals applied to summing amplifier 78 of FIG. 9, and are herein designated collectively as QA-1. They are applied along with the signal 1 to the summing amplifier 78 (FIG. 10) to produce the QA signal, which is multiplied by K in unit 79 as previously. Multiplier 79 delivers the scale factor correction signal to the servo 43 as before.

*Conclusion*

From the foregoing description it is apparent that the apparatus of the invention provides for most accurate agreement and most rapid stepping into agreement of the slave computers with the master computers. Best accuracy and speed of computation is assured by computing earth curvature correction factors and other intermediate computer variables as most direct dependent functions of the master variables and recomputing the slave variables as dependents of such earth curvature correction factor and intermediate variables. This assures smooth transition from "on map" to "off map" conditions, and vice versa. The apparatus of FIGS. 8 and 9 of the present invention minimizes the addition of computing elements to that of the Zahner et al. application by using a single channel to provide a pair of feedback loops for the $\delta$ and $\rho-\rho_0$ computers under "on map" conditions, and to generate the X and Y error signals for delivery to their respective integrators under "off map" conditions. Another channel, namely that producing the $\theta$ and $\phi$ error signals, shares a large number of elements with the channel providing the input signals for the $\delta$ and $\rho-\rho_0$ computers of both applications. Therefore the apparatus of the Zahner et al. application may be readily modified, in the field if desired, to incorporate the improvements provided by the present invention. The embodiment of FIG. 10 hereof is particularly efficient, since the two last-mentioned channels are also reduced to a single channel.

While two specific embodiments of the invention have been described and modifications of some of its parts have been suggested, it should be understood that the invention is not limited to specific details of construction and arrangement thereof herein illustrated, as further changes and modifications may occur to those skilled in the art without departing from the spirit of the invention.

As used in the claims a "function of a variable (or signal)" or a "relation of a variable (or signal)", and similar derivative terms are intended generically to include linear functions or relations of the variable or signal, including the variable itself, as well as non-linear functions or relations.

What is claimed is:

1. In a course recording system including a latitude and a longitude integrating system for computing and indicating the instant latitude and longitude of a craft in response to signals representing North-South and East-West velocity components of said craft and providing output signals defined as actually computed latitude and longitude signals respectively; an X and a Y integrating system for computing and recording on an earth projection map the instant position of said craft relative to an origin of a Cartesian coordinate system defining the map surface as distinguished from latitude and longitude coordinates also defining said map, the X and Y integrators providing output signals respectively defined as actually computed X and Y signals; and two earth curvature correction factor computers providing respective output signals at least one of which is applied to said X and Y integrators to cause the latter correctly to record the course of said craft: the invention comprising at least four computing channels, the first of said channels including said earth curvature correction factor computers under said "on map" conditions and delivering as output signals the earth curvature correction signals computed as directly dependent variables of the actually computed X and Y signals applied to such channel as input signals under said "on map" conditions; the second of said channels including means delivering latitude and longitude signals recomputed at least under said "on map" conditions as directly dependent variables of the earth curvature correction signals computed as last said and applied to such recomputation channel as input signals at least under said "on map" conditions, said second channel including respective means for comparing the actually computed and recomputed latitude and longitude signals and producing latitude and longitude error signals respectively; the third of said channels including said earth curvature correction factor computers under said "off map" conditions and delivering as output signals the earth curvature correction signals computed as directly dependent variables of the actually computed latitude and longitude signals applied to such channel as input signals under said "off map" conditions; and the fourth of said channels including means delivering X and Y signals recomputed at least under said "off map" conditions as directly dependent variables of the earth curvature correction signals computed as last said and applied to such recomputation channel at least under said "off map" conditions, said fourth channel including respective means for comparing the actually computed and recomputed X and Y signals and producing X and Y error signals respectively; means to apply said latitude and longitude error signals to their respective integrating systems under "on map" conditions to force such systems into computational agreement with said X and Y integrating systems, and means to apply said X and Y error signals to their respective integrating systems under "off map" conditions to force such systems into computational agreement with said latitude and longitude integrating systems.

2. The invention according to claim 1, wherein at least a portion of one of the aforesaid recomputation channels serves to provide a pair of feedback loops for the earth curvature correction factor computers under those map conditions where the other recomputation channel delivers its error signals to their respective integrators.

3. The invention according to claim 1, wherein at least a portion of the fourth channel serves to provide a pair of feedback loops for the earth curvature correction factor computers under "on map" conditions.

4. The invention according to claim 1, wherein the earth curvature correction factor computers under "on map" conditions receive as input signals the actually computed X and Y signals, and wherein the fourth channel produces the recomputed X and Y signals also under "on map" conditions, provided with means to apply said recomputed X and Y signals under "on map" conditions as feedback signals to said earth curvature correction factor computers.

5. The invention according to claim 4, wherein the net signals applied to the earth curvature correction factor computers under "on map" conditions are X and Y error signals, said net signals resulting from the combinations of input and feedback signals.

6. The invention according to claim 1, wherein, for purposes of preparation for smooth and rapid transition of the course recording system from "on map" to "off map" conditions and vice versa, the second channel produces the X and Y recomputed and error signals also under "on map" conditions as directly dependent variables of the earth curvature correction variables in turn computed as directly dependent variables of the actual X and Y rather than the actual latitude and longitude signal variables respectively, and the fourth channel produces the latitude and longitude recomputed and error signals also under "off map" conditions as directly dependent variables of the earth curvature correction variables in turn computed as directly dependent variables of the actual latitude and longitude rather than the actual X and Y signal variables respectively.

7. The invention according to claim 1, wherein the map projection is a conic projection and the earth curvature correction factor computers are respectively computers of the meridian tilt angle and of a function of $\rho$, both corresponding to the instant location of the craft, $\rho$ being the distance from the pole point of the projection to the instant location of the craft, said meridian tilt angle computer providing a corrective signal for the X and Y integrators, wherein the third channel includes computing means producing a meridian tilt angle and a function of $\rho$ input signal for the respectively like-named computers, the latter two input signals being produced as directly dependent variables of the actual longitude and latitude signal variables respectively, and wherein in the second channel the recomputed longitude and latitude signals are produced respectively as directly dependent variables of meridian tilt angle and function of $\rho$ output signals produced by the respectively like-named computers, the computation in said second channel being essentially a reverse of the computation in said third channel.

8. The invention according to claim 7, provided with a computing subsystem for producing a plurality of functions of latitude output signals, said subsystem being included in the third channel under "off map" conditions and in the second channel under "on map" conditions, means for applying an input signal to said subsystem under "off map" conditions that is derived from the actual latitude signal, means to apply to said function of $\rho$ computer under "off map" conditions the aforesaid function $\rho$ input signal formed as a combination of some of said plurality of subsystem output signals, means for recomputing the variable represented by the signal derived from the actual latitude signal, the latter recomputing means being included in said second channel and receiving as input signal the aforesaid function $\rho$ output signal under both "on map" and "off map" conditions and producing a corresponding recomputed function of latitude output signal, computing means also included in said second channel receiving said recomputed function of latitude output signal as input signal and producing the aforesaid recomputed latitude signal, means to apply said recomputed function of latitude signal as input signal to said subsystem under "on map" conditions, and means for applying under both "on map" and "off map" conditions an additional input signal to said function of latitude recomputing means formed as a combination of some of said plurality of subsystem output signals, whereby said subsystem output signals are computed as most directly dependent variables of the actual X and Y signal variables under "on map" conditions and of the actual latitude signal variable under "off map" conditions.

9. The invention according to claim 8, provided with means for computing map scale factor according to the instant craft location and applying a corrective signal to the X and Y integrators, said scale factor computing means receiving an input signal formed as a combination of some of the aforesaid plurality of subsystem output signals to produce said scale factor corrective signal as a most directly dependent variable of the actual X and Y signal variables under "on map" conditions and of the actual latitude signal variable under "off map" conditions.

10. The invention according to claim 1, wherein at least a portion of the second channel serves to provide a pair of feedback loops for the earth curvature correction factor computers under "off map" conditions.

11. The invention according to claim 1, wherein the earth curvature correction factor computers under "off map" conditions receive as input signals the actually computed latitude and longitude signals, and wherein the second channel produces the recomputed latitude and longitude signals also under "off map" conditions, provided with means to apply said recomputed latitude and longitude signals under "off map" conditions as feedback signals to said earth curvature correction factor computers.

12. The invention according to claim 11, wherein the net signals applied to the earth curvature correction factor computers under "off map" conditions are latitude and longitude error signals, said net signals resulting from the combinations of input and feedback signals.

13. The invention according to claim 11, wherein the map projection is a conic projection and the earth curvature correction factor computers are respectively computers of the meridian tilt angle and of a function of $\rho$ receiving under "off map" conditions the actually computed longitude and latitude signals respectively, $\rho$ being the distance from the pole point of the projection to the instant location of the craft, said meridian tilt angle computer providing a corrective signal for the X and Y integrators, wherein the recomputed longtitude and latitude signals are produced in response to output signals from said meridian tilt angle and function of $\rho$ computers under both "on map" and "off map" conditions, and are fed back to the input sides of said meridian tilt and function of $\rho$ computers under "off map" conditions respectively.

14. The invention according to claim 13, wherein the second channel includes under both "on map" and "off map" conditions a subchannel producing the aforesaid recomputed latitude signal, said subchannel at its input side receiving a function of $\rho$ output signal from the like-named computer and at its output side being coupled under "on map" conditions to the input side of said function of $\rho$ computer in feedback relation, said subchannel including computer means producing an output signal representing a variable related to latitude of the craft in response to said function of $\rho$ output signal, and a computer producing said recomputed latitude signal in response to said latitude-related-to output signal, said computer producing the latitude-related-to signal being provided with a feedback loop that includes a computing subsystem responsive to said latitude-related-to signal for producing a plurality of functions of latitude output signals, and means for applying a signal formed as a combination of some of said plurality of functions of latitude signals as a feedback signal to said latitude-related-to computer, whereby said recomputed latitude, said latitude-related-to, and said plurality of function of latitude signals are computed as most directly dependent variables of the actually computed X and Y signals under "on map" conditions, and of the actually computed latitude signal under "off map" conditions.

15. The invention according to claim 14, provided with means for computing map scale factor according to the instant craft location and applying a corrective signal to the X and Y integrators, said scale factor computing means receiving an input signal formed as a combination of some of the aforesaid plurality of subsystem output signals to produce said scale factor corrective signal as a most directly dependent variable of the actual X and Y signal variables under "on map" conditions and of the actual latitude signal variable under "off map" conditions.

16. The invention according to claim 1, wherein the map projection is a conic projection and the earth curvature correction factor computers are respectively computers of the meridian tilt angle and of a function of $\rho$, $\rho$ being the distance from the pole point of the projection to the instant location of the craft, said meridian tilt angle computer providing a corrective signal for the X and Y integrators, wherein said meridian tilt angle and function of ρ computers under "on map" conditions essentially constitute the first channel and receive as input signals the actually computed X and Y signals respectively, and wherein the fourth channel includes a plurality of interacting computing systems producing the recomputed X and Y signals each as a dependent joint variable of a meridian tilt angle and a function of ρ output signal produced by the respectively like-named computers under both "on map" and "off map" conditions, whereby said recomputed X and Y signals are most directly dependent variables of the actually computed X and Y signals respectively under "on map" conditions and each jointly of the actually computed latitude and longitude signals under " off map" conditions, and means for respectively applying said recomputed X and Y signals to said meridian tilt and function of ρ computers as feedback signals under "on map" conditions.

17. The invention according to claim 16, wherein the meridian tilt angle and function of ρ computers under "off map" conditions essentially constitute the third channel and receive as input signals the actually computed longitude and latitude signals respectively, and wherein the second channel includes a pair of subchannels, one of said subchannels producing the recomputed longitude signal as a dependent variable of a meridian tilt angle output signal produced by the like-named computer under both "on map" and "off map" conditions, and the other subchannel producing the recomputed latitude signal as a dependent variable of a function of ρ output signal produced by the like-named computer under both "on map" and "off map" conditions, whereby said recomputed longitude and latitude signals are most directly dependent variables of the actually computed longitude and latitude signals respectively under "off map" conditions and each jointly of the actually computed X and Y signals under "on map" conditions, and means for respectively applying said recomputed longitude and latitude signals to said meridian tilt and function of ρ computers as feedback signals under "off map" conditions.

18. The invention according to claim 17, wherein the aforesaid other subchannel includes computer means producing an output signal representing a variable related to latitude of the craft in response to the aforesaid function of ρ output signal, and a computer producing said recomputed latitude signal in response to said latitude-related-to output signal, said computer producing the latitude-related-to signal being provided with a feedback loop that includes a computing subsystem responsive to said latitude-related-to signal for producing a plurality of functions of latitude output signals, and means for applying a signal formed as a combination of some of said plurality of functions of latitude signals as a feedback signal to said latitude-related-to computer, whereby said recomputed latitude, said latitude-related-to, and said plurality of function of latitude signals are computed as most directly dependent variables of the actually computed X and Y signals under "on map" conditions, and of the actually computed latitude signal under "off map" conditions.

19. The invention according to claim 18, provided with means for computing map scale factor according to the instant craft location and applying a corrective signal to the X and Y integrators, said scale factor computing means receiving an input signal formed as a combination of some of the aforesaid plurality of subsystem output signals to produce said scale factor corrective signal as a most directly dependent variable of the actual X and Y signal variables under "on map" conditions and of the actual latitude signal variable under "off map" conditions.

20. In a course recording system including a latitude and a longitude integrating system for computing and indicating the instant latitude and longitude of a craft in response to signals representing components of said craft along first and second geographical directions and providing output signals defined as actually computed latitude and longitude signals respectively; a third and a fourth integrating system for computing and recording on an earth projection map the instant position of said craft relative to an origin of a coordinate system defining the map surface as distinguished from latitude and longitude coordinates also defining said map, the third and fourth integrators providing output signals respectively defined as actually computed third and fourth signals corresponding to the mutually perpendicular may surface defining coordinates; and two earth curvature correction factor computers providing respective output signals at least one of which is applied to said third and fourth integrators to cause the latter correctly to record the course of said craft: the invention comprising at least four computing channels, the first of said channels including said earth curvature correction factor computers under said "on map" conditions and delivering as output signals the earth curvature correction signals computed as directly dependent variables of the actually computed third and fourth signals applied to such channel as input signals under said "on map" conditions; the second of said channels including means delivering latitude and longitude signals recomputed at least under said "on map" conditions as directly dependent variables of the earth curvature correction signals computed as last said and applied to such recomputation channel as input signals at least under said "on map" conditions, said second channel including respective means for comparing the actually computed and recomputed latitude and longitude signals and producing latitude and longitude error signals respectively; the third of said channels including said earth curvature correction factor computers under said "off map" conditions and delivering the earth curvature correction signals as directly dependent variables of the actually computed latitude and longitude signals applied to such channel under said "off map" conditions; and the fourth of said channels including means delivering corresponding third and fourth signals recomputed at least under said "off map" conditions as directly dependent variables of the earth curvature correction signals computed as last said and applied to such recomputation channel at least under said "off map" conditions, said fourth channel including respective means for comparing the actually computed and recomputed third and fourth signals and producing third and fourth error signals respectively; means to apply said latitude and longitude error signals to their respective integrating systems under "on map" conditions to force such systems into computational agreement with said third and fourth integrating systems, and means to apply said third and fourth error signals to their respective integrating systems under "off map" conditions to force such systems into computational agreement with said latitude and longitude integrating systems.

References Cited in the file of this patent

UNITED STATES PATENTS

| | | |
|---|---|---|
| 2,560,528 | Dehmel | July 10, 1951 |
| 2,796,681 | Ringham et al. | June 25, 1957 |
| 2,829,446 | Cutler et al. | Apr. 8, 1958 |
| 2,853,800 | Cutler et al. | Sept. 30, 1958 |
| 2,857,234 | Murray | Oct. 21, 1958 |
| 2,878,585 | Steiner | Mar. 24, 1959 |